(12) United States Patent
Miyata

(10) Patent No.: US 7,657,042 B2
(45) Date of Patent: Feb. 2, 2010

(54) LIQUID CRYSTAL DISPLAY DEVICE HAVING SOUND

(75) Inventor: Kazuhiko Miyata, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 928 days.

(21) Appl. No.: 10/526,410

(22) PCT Filed: Aug. 28, 2003

(86) PCT No.: PCT/JP03/10998

§ 371 (c)(1),
(2), (4) Date: Sep. 26, 2005

(87) PCT Pub. No.: WO2004/023199

PCT Pub. Date: Mar. 18, 2004

(65) Prior Publication Data

US 2006/0227981 A1    Oct. 12, 2006

(30) Foreign Application Priority Data

Sep. 3, 2002  (JP) ............................. 2002-258189
Mar. 18, 2003  (JP) ............................. 2003-074196

(51) Int. Cl.
*H04R 25/00* (2006.01)
(52) U.S. Cl. ...................... 381/152; 381/333; 381/388
(58) Field of Classification Search ................ 381/152, 381/306, 333, 338, 388, 398, 431, 190; 361/681, 361/682, 683, 686; 181/171, 172
See application file for complete search history.

(56) References Cited

U.S. PATENT DOCUMENTS

| 5,993,006 | A | 11/1999 | Takeuchi et al. | |
| 6,427,017 | B1 | 7/2002 | Toki | |
| 7,050,600 | B2 * | 5/2006 | Saiki et al. | 381/388 |
| 7,174,025 | B2 * | 2/2007 | Azima et al. | 381/152 |
| 2002/0064290 | A1 | 5/2002 | Reynaga et al. | |
| 2002/0065113 | A1 | 5/2002 | Mori | |
| 2002/0107044 | A1 | 8/2002 | Kuwata et al. | |

FOREIGN PATENT DOCUMENTS

| GB | 2 343 811 A | 5/2000 |
| GB | 2 360 901 A | 10/2001 |

(Continued)

*Primary Examiner*—Huyen D Le
(74) *Attorney, Agent, or Firm*—Keating & Bennett, LLP.

(57) ABSTRACT

A liquid crystal display device includes a sound output function. A sound output function can be added to a liquid crystal device having a light source while preventing any increase in the external size of the liquid crystal display device. The liquid crystal display device includes a liquid crystal layer sandwiched between a first substrate and a second substrate which oppose each other, a flexible printed circuit (FPC) connected to a brim portion of the second substrate, a light guide plate, and an LED. An excitation source is arranged at a portion corresponding to the back side of the FPC connection portion on the second substrate. The excitation source deflects and vibrates the second substrate of the liquid crystal display panel according to a sound signal from an outside source. That is, the second substrate is used as a vibration plate for the output of a sound. The liquid crystal display device can preferably be used for a liquid crystal module used in mobile devices such as a mobile telephone and a PDA.

48 Claims, 13 Drawing Sheets

FOREIGN PATENT DOCUMENTS

| | | |
|---|---|---|
| JP | 63-280293 | 11/1988 |
| JP | 05-94898 | 12/1993 |
| JP | 2000-152385 | 5/2000 |
| JP | 2001-189978 | 7/2001 |
| JP | 2002-369290 | 12/2002 |
| JP | 2003-125315 | 4/2003 |
| JP | 2003-271074 | 9/2003 |
| WO | WO 00/02417 | 1/2000 |

* cited by examiner

LIQUID CRYSTAL DISPLAY DEVICE HAVING SOUND

BACKGROUND OF THE INVENTION

1. Field of the Invention

The present invention relates to a liquid crystal display device used as a liquid crystal display module in various kinds of electronic devices, and relates more particularly to adding a sound output function to such a liquid crystal display device. The present invention can be used in any type of electronic device having a liquid crystal display device and is particularly well suited for use in a liquid crystal display module used in portable devices such as cell phones and PDAs.

2. Description of the Related Art

Liquid crystal display (LCD) devices are typically used as the display device in cell phones, PDAs (personal digital assistants), and other portable devices. Rising demand for greater display capacity in these LCD devices has meant that the LCD screen area has also tended to grow. Furthermore, as screen size has increased so has demand for size and weight reductions in the portable devices in which the LCD devices are used. As a result, providing sufficient space for a speaker and a receiver (microphone) in a portable device also requiring a function for sound input and output has become increasingly difficult.

A transparent speaker made from a piezoelectric diaphragm including a transparent piezoelectric element and a transparent electrode, and a frame supporting the periphery of the diaphragm, has thus been proposed (see, for example, Japanese Unexamined Patent Appl. Pub. 2000-152385). A speaker function can thus be achieved without obstructing the LCD by arranging the transparent speaker over the front of the LCD panel.

A panel speaker including a diaphragm that also functions as an optical filter in the LCD device, and an exciter affixed to the back of the four edge portions of this diaphragm, has also been proposed (see, for example, Japanese Unexamined Patent Appl. Pub. 2001-189978). This panel speaker uses the same space for both the display and sound generation, and thus offers the advantage of not requiring excessive space to provide both a display and audio output.

A loudspeaker drive unit has also been achieved by driving transparent panel-shaped members disposed in front of the display surface of an LCD device, for example, with a vibration exciter disposed at the edges or peripheral portions of the panel member. (See Japanese Examined Patent Pub. 2002-533957, for example.)

A problem with these methods of the foregoing prior art is that the thickness of the device in which the display device is used increases because the speaker is arranged over the display surface. Furthermore, because the exciter (vibration source) is disposed around the edges of the LCD panel in the foregoing panel speaker, the exciter competes for space with other components similarly disposed in this peripheral area. LCD devices commonly use a light emitting diode (LED) or other light source, and installation space for this light source competes with installation space for the exciter of the foregoing panel speaker in the edge portions of the LCD panel. Using a panel speaker as described above therefore does not necessarily yield the expected space savings. As a result, the external size of the LCD device increases when a sound output function is added, and this is particularly a problem with portable devices. Furthermore, because the prior art as described above requires that a separate panel member be used as the speaker diaphragm in front of the display, the thickness of the frame (casing) in which the LCD device is housed is increased, and adding a sound output function causes a decrease in transmittance and thus degrades the quality of displayed images.

SUMMARY OF THE INVENTION

In order to overcome the problems described above, preferred embodiments of the present invention provide a liquid crystal display device having a light source to which a sound output function and the like can be added while preventing an increase in external size and a decrease in display quality.

According to a first aspect of a preferred embodiment of the present invention, a liquid crystal display device includes a liquid crystal panel including a first substrate, a second substrate, and a liquid crystal layer disposed between the first substrate and second substrate, and a light guide plate disposed on the side of the second substrate that is not in contact with the liquid crystal layer, the liquid crystal display device including a connection terminal portion disposed at an edge portion of the second substrate on the side thereof in contact with the liquid crystal layer, an excitation source disposed at an edge portion of the second substrate on the side thereof not in contact with the liquid crystal layer at a position opposite to the connection terminal portion, and a light source disposed near at least one side of the light guide plate other than the side of the light guide plate closest to the excitation source so that light enters the light guide plate from the side to which the light source is disposed, wherein the excitation source produces sound by causing the second substrate to flexurally vibrate according to an externally supplied sound signal.

The present preferred embodiment prevents an increase in the external size of a liquid crystal display device resulting from adding a sound output function (speaker function) to the liquid crystal display device because the second substrate of the liquid crystal panel is used as the diaphragm for sound output, the excitation source is disposed at an edge portion of the second substrate on the side opposite to the connector portion, that is, in an area where space is available, and the light source is disposed near at least one side of the light guide plate other than the side of the light guide plate closest to the excitation source. A decrease in display quality resulting from adding a sound output function can also be avoided because the second substrate of the liquid crystal panel is used as the diaphragm and separately providing a diaphragm for sound output in front of the display unit is not necessary.

A second aspect of the present preferred embodiment is characterized by the light source in the first aspect of the present preferred embodiment being disposed opposite to the excitation source with the light guide plate therebetween.

This second aspect of the present preferred embodiment prevents an increase in the external size of the liquid crystal display device resulting from adding an excitation source because the light source is disposed opposite to the excitation source with the light guide plate therebetween.

A third aspect of the present preferred embodiment is characterized by the light source in the first aspect of the present preferred embodiment being disposed near a side of the light guide plate that is adjacent to the side closest to the excitation source.

With this third aspect of the present preferred embodiment, the light source is disposed near a side of the light guide plate that is adjacent to the side of the light guide plate closest to the excitation source. As a result, the light source can be disposed by effectively using a non-display area in an edge portion of the second substrate when an IC chip (bare chip) driver circuit is mounted to an edge portion of the second substrate in the area on the opposite side as the light source. As a result, an increase in the external size due to adding a sound output function to the liquid crystal display device can be prevented.

A fourth aspect of the present preferred embodiment is a liquid crystal display device having a liquid crystal panel including a first substrate, a second substrate, and a liquid crystal layer disposed between the first substrate and second substrate, and a light guide plate disposed on the side of the first substrate or second substrate that is not in contact with the liquid crystal layer, the liquid crystal display device including a light source disposed near a predetermined side of the light guide plate so that light enters the light guide plate from the predetermined side, and an excitation source disposed at an edge portion of the first or second substrate near a side of the light guide plate other than the predetermined side, wherein the excitation source produces sound by causing the first or second substrate to flexurally vibrate according to an externally supplied sound signal.

This fourth aspect of the present preferred embodiment prevents an increase in the external size of the liquid crystal display device resulting from adding a sound output function because the first or second substrate of the liquid crystal panel is used as the diaphragm for sound output, and the light source and the excitation source are disposed at an edge portion of the first or second substrate so that the light source and excitation source do not compete for installation space.

A fifth aspect of the present preferred embodiment is characterized by the light source in the fourth aspect of the present preferred embodiment being disposed opposite to the excitation source with the light guide plate therebetween.

This fifth aspect of the present preferred embodiment prevents an increase in the external size of the liquid crystal display device resulting from adding an excitation source because the light source is disposed opposite to the excitation source with the light guide plate therebetween.

A sixth aspect of the present preferred embodiment is characterized by the light source in the fourth aspect of the present preferred embodiment being disposed near a side of the light guide plate that is adjacent to the side closest to the excitation source.

With this sixth aspect of the present preferred embodiment, the light source can be disposed by effectively using a non-display area in an edge portion of the first or second substrate when an IC chip (bare chip) driver circuit is mounted to an edge portion of the first or second substrate in the area thereof on the side opposite to the light source. As a result, an increase in the external size due to adding a sound output function to the liquid crystal display device can be prevented.

A seventh aspect of the present preferred embodiment is characterized by any of the first to sixth aspects of the present preferred embodiment further including a frame for housing the liquid crystal panel and light guide plate, wherein the excitation source is disposed in contact with the frame or bonded to the frame, and causes the frame to flexurally vibrate according to the sound signal.

This seventh aspect of the present preferred embodiment achieves high output volume because the excitation source causes the frame to flexurally vibrate in addition to the first or second substrate.

An eighth aspect of the present preferred embodiment is characterized by any of the first to sixth aspects of the present preferred embodiment wherein the first and second substrates include a glass plate of which one side is in contact with the liquid crystal layer, and a sheet of optical material disposed to cover a predetermined effective display area on the other side of the glass plate, and the excitation source is disposed in contact with the glass plate at an edge portion thereof in an area outside the effective display area on the other side of the first or second substrate, and directly causes the glass plate to flexurally vibrate according to the sound signal.

This eighth aspect of the present preferred embodiment enables the sound energy produced by the mechanical vibrations generated by the excitation source to propagate efficiently because the excitation source directly causes the glass plate that is part of the first or second substrate to flexurally vibrate according to a sound signal.

A ninth aspect of the present preferred embodiment is characterized by any of the first to third aspects of the present preferred embodiment wherein the excitation source is disposed at an edge portion of the second substrate on the side thereof not in contact with the liquid crystal layer at a position corresponding to a middle portion of the connection terminal portion.

Sound energy produced by the mechanical vibrations generated by the excitation source is transmitted uniformly in the liquid crystal panel with this ninth aspect of the present preferred embodiment because the excitation source is disposed at an edge portion on the outside surface of the second substrate at a position corresponding to the middle of the connection terminal portion.

A tenth aspect of the present preferred embodiment is the ninth aspect of the present preferred embodiment further including a frame for housing the liquid crystal panel and light guide plate, and a chassis fit to an inside surface on the back side of the frame so as to support the liquid crystal panel, wherein the liquid crystal panel is housed in the frame so that the first substrate is positioned on the front side and the second substrate is positioned on the back side, and the chassis has a thick-walled portion located in corner areas at both end portions of the edge portion on the side of the second substrate that is not in contact with the liquid crystal layer.

This tenth aspect of the present preferred embodiment can support and secure the liquid crystal panel stably inside the frame, and the thick-walled portions stabilize the fit of the chassis to the frame, because the thick-walled portions formed in the corners of the chassis support the liquid crystal panel.

An eleventh aspect of the present preferred embodiment is any of the first to sixth aspects of the present preferred embodiment further including at least one other excitation source in addition to the excitation source, wherein the other excitation source causes the first or second substrate to flexurally vibrate according to an externally supplied sound signal.

This eleventh aspect of the present preferred embodiment can produce a high sound volume because there is a plurality of excitation sources and the same sound signal is input to each of the excitation sources. In addition, a three-dimensional sound can be achieved or the sound output position can be controlled in the liquid crystal panel by inputting different sound signals (sound signals from different signal sources, or sound signals of different phase and amplitude from the same signal source) to the excitation sources.

A twelfth aspect of the present preferred embodiment is any of the first to sixth aspects of the present preferred embodiment further including a pickup unit for converting vibrations of the first or second substrate to electric signals when external sound waves cause the first or second substrate to vibrate, wherein the pickup unit, instead of the excitation source, is disposed in the position of the excitation source, or is disposed near the excitation source together with the excitation source.

By providing a pickup unit instead of an excitation source, this twelfth aspect of the present preferred embodiment achieves a sound input function (microphone function) in the liquid crystal display device while preventing an increase in external size. Furthermore, both a sound input function and a sound output function can be achieved in a liquid crystal display device while preventing an increase in the external size by disposing a pickup unit near the excitation source in conjunction with the excitation source.

A thirteenth aspect of the present preferred embodiment is an electronic device having a liquid crystal display device according to the eleventh aspect of the present preferred embodiment, including a signal processor arranged to change the sound output position in the first or second substrate by controlling the phase and amplitude of sound signals to be input to the plurality of excitation sources including the other excitation source.

This thirteenth aspect of the present preferred embodiment can thus control the position from which sound is produced from the liquid crystal panel as a result of the signal processor controlling the phase and amplitude of the sound signals to be input to the plurality of excitation sources.

A fourteenth aspect of the present preferred embodiment is an electronic device having a liquid crystal display device according to the eleventh aspect of the present preferred embodiment, including a data processor for receiving combined data containing image data representing an image to be displayed on the liquid crystal panel and position data denoting a sound output position in the image, and separating and outputting the image data and position data, and a signal processor arranged to control the phase and amplitude of sound signals to be input to the plurality of excitation sources including the other excitation source based on the position data output from the data processor so that sound is output from a position in the first or second substrate corresponding to the sound output position in the image.

By controlling the phase and amplitude of the sound signals to be input to the plurality of excitation sources based on the position data output from the data processor, this fourteenth aspect of the present preferred embodiment can output sound from the position on the liquid crystal panel corresponding to the position in the image indicated by the position data, and can thus link the image displayed on the liquid crystal panel and the sound emitted from the liquid crystal panel.

A fifteenth aspect of the present preferred embodiment is characterized by including a liquid crystal display device according to any of the first to twelfth aspects of the present preferred embodiment.

This fifteenth aspect of the present preferred embodiment thus achieves the same effects as the first to twelfth aspects of the present preferred embodiment.

A sixteenth aspect of the present preferred embodiment is any of the first to sixth aspects of the present preferred embodiment further including a frame for housing the liquid crystal panel and light guide plate, and a structural panel disposed between the frame and the liquid crystal panel or the light guide plate so that one side of the structural panel is in contact with the inside surface of the frame, wherein the excitation source is disposed in contact with the other side of the structural panel, or bonded to the other side, and causes the frame to flexurally vibrate according to the sound signal simultaneously with the liquid crystal panel by way of the intervening structural panel.

This sixteenth aspect of the present preferred embodiment can achieve a high sound output volume because the excitation source causes the structural panel and frame to flexurally vibrate in addition to the substrate according to the sound signal.

A seventeenth aspect of the present preferred embodiment is the sixteenth aspect of the present preferred embodiment wherein the structural panel is located on the display surface side of the liquid crystal panel and includes a sensor function arranged to function as an operating unit.

By providing a structural panel with a sensor function enabling operation as an operating unit, this seventeenth aspect of the present preferred embodiment thus enables an arrangement whereby the liquid crystal display device alone can produce vibrations in the excitation source triggered by a specific operation.

An eighteenth aspect of the present preferred embodiment is the sixteenth aspect of the present preferred embodiment wherein the structural panel is located on the display surface side of the liquid crystal panel and includes a complementary display.

This eighteenth aspect of the present preferred embodiment can produce high sound volume because the structural panel can be driven to flexurally vibrate not only where the panel overlaps the display surface of the liquid crystal display device but also in the portion having a display area outside the liquid crystal display area.

A nineteenth aspect of the present preferred embodiment is the seventeenth or eighteenth aspect of the present preferred embodiment wherein the structural panel has a display indicating functions executed by predetermined operations, and the excitation source receives a signal denoting a vibration pattern corresponding to the predetermined operation from a predetermined signal generating structure disposed externally or internally to the liquid crystal display device, and causes the structural panel to flexurally vibrate in a vibration pattern corresponding to the predetermined operation based on the signal.

The excitation source in this nineteenth aspect of the present preferred embodiment can selectively generate specific vibration patterns predefined for specific operations because the structural panel displays functions that can be executed via specific predefined operations.

A twentieth aspect of the present preferred embodiment is an electronic device including a liquid crystal display device according to any of the sixteenth to nineteenth aspects of the present preferred embodiment.

This twentieth aspect of the present preferred embodiment achieves the same effects as the sixteenth to nineteenth aspects of the present preferred embodiment.

A twenty-first aspect of the present preferred embodiment is a liquid crystal display device having a liquid crystal panel including a first substrate, a second substrate, and a liquid crystal layer disposed between the first substrate and second substrate, a light guide plate disposed on the side of the second substrate that is not in contact with the liquid crystal layer, and a frame for housing the liquid crystal panel and light guide plate, the liquid crystal display device including a connection terminal portion disposed at an edge portion on the side of the second substrate in contact with the liquid crystal layer, an excitation source disposed and bonded to the inside surface of the frame at a position facing an edge portion of the second substrate on the surface thereof not in contact with the liquid crystal layer at a position on the opposite side as the connection terminal portion so that vibration is not transmitted directly to the opposite-side edge portion, and a light source held in the frame and disposed near at least one side of the light guide plate other than the side of the light guide plate closest to the excitation source so that light enters the light guide plate from the at least one side to which the light source is disposed, wherein the excitation source produces sound by causing the frame to flexurally vibrate according to an externally supplied sound signal.

This twenty-first aspect of the present preferred embodiment can prevent an increase in the external size of the liquid crystal display device due to the addition of a sound output function (speaker function) because the frame of the liquid crystal display device (liquid crystal display module) is used as the diaphragm for producing sound, the excitation source is disposed at an edge portion of the second substrate in an area on the opposite side as the connection terminal portion, that is, in an area where space is available, and the light source is disposed at at least one side of the light guide plate other than the side of the light guide plate that is closest to the excitation source. Furthermore, vibrations from the excitation source are emitted primarily from the frame of the liquid crystal display device, an internal space inside the device including the liquid crystal display device as an LCD module, or the frame or another portion of the device other than the display surface. As a result, if this LCD module is used in a device having a touch sensor provided over the display panel and small button icons or smaller points on the display are selected using a stylus for hyperlinking operations, to specify the location for such data processing operations as drawing lines, enlarging, or reducing an image in a computer-aided drawing program, to make gestures, or to make menu selections, for example, sound vibrations will not interfere with such pointing operations. A liquid crystal display device (liquid crystal display module) according to the present preferred embodiment can thus also be used in applications requiring the ability to point to a position precisely and accurately.

A twenty-second aspect of the present preferred embodiment is the twenty-first aspect of the present preferred embodiment wherein the excitation source is disposed with a space between the excitation source and the second substrate to avoid contact with the second substrate at the expected vibration amplitude of the excitation source.

By providing the minimum space allowing the expected sound vibrations between the excitation source and the liquid crystal panel with the twenty-second aspect of the present preferred embodiment, the transmission of vibrations from the excitation source to the liquid crystal panel can be substantially prevented without increasing the thickness of the LCD module.

A twenty-third aspect of the present preferred embodiment is the twenty-first aspect of the present preferred embodiment further including a buffer material between the excitation source and the second substrate.

By providing a buffer material between the excitation source and the liquid crystal panel (second substrate), this twenty-third aspect of the present preferred embodiment improves the resistance of the excitation source to external stresses other than the sound vibrations produced by the excitation source, and can minimize or eliminate the transmission of vibration to the liquid crystal panel from the excitation source without increasing the thickness of the LCD module.

A twenty-fourth aspect of the present preferred embodiment is any of the twenty-first to twenty-third aspects of the present preferred embodiment further including a buffer material between the liquid crystal panel and frame.

In addition to minimizing or eliminating the direct transmission of vibration from the excitation source to the liquid crystal panel, the buffer material disposed in this twenty-fourth aspect of the present preferred embodiment between the frame of the LCD module and the liquid crystal panel can minimize or eliminate the transmission of vibration to the liquid crystal panel from the frame that functions as the primary diaphragm driven by the excitation source.

A twenty-fifth aspect of the present preferred embodiment is any of the twenty-first to twenty-fourth aspects of the present preferred embodiment further including a buffer material between the liquid crystal panel and light guide plate.

With this twenty-fifth aspect of the present preferred embodiment the buffer material disposed between the light guide plate and liquid crystal panel supports the liquid crystal panel freely and reduces the inertial mass, and thereby efficiently minimizes or eliminates the transmission of vibrations from other portions of the LCD module to the liquid crystal panel.

A twenty-sixth aspect of the present preferred embodiment is any of the twenty-first to twenty-fourth aspects of the present preferred embodiment further including a buffer material between the light guide plate and frame.

The buffer material thus disposed between the frame of the LCD module and the light guide plate in this twenty-sixth aspect of the present preferred embodiment freely supports both the light guide plate and liquid crystal panel in contact with each other, prevents vibrations from changing the light path from the light source, and minimizes or eliminates the transmission of vibrations from the frame.

A twenty-seventh aspect of the present preferred embodiment is any of the twenty-first to twenty-sixth aspects of the present preferred embodiment wherein the light source is disposed opposite the excitation source with the light guide plate therebetween.

This twenty-seventh aspect of the present preferred embodiment can prevent an increase in the external size of a liquid crystal display device resulting from adding an excitation source thereto even when the excitation source uses primarily the frame as the diaphragm because the light source is located opposite the excitation source with the light guide plate therebetween.

A twenty-eighth aspect of the present preferred embodiment is any of the twenty-first to twenty-sixth aspects of the present preferred embodiment wherein the light source is disposed near a side of the light guide plate that is adjacent to the side closest to the excitation source.

This twenty-eighth aspect of the present preferred embodiment thus disposes the light source near a side of the light guide plate that is adjacent to the side of the light guide plate closest to the excitation source even in an arrangement in which the excitation source uses primarily the frame as the diaphragm. Therefore, in an arrangement in which an IC chip (bare chip) driver circuit is mounted to an edge portion of the second substrate in the area on the side that is opposite to the light source, the light source can be disposed by effectively using a non-display area in the edge portion of the second substrate. As a result, an increase in the external size of the liquid crystal display device caused by adding a sound output function can be reliably prevented.

A twenty-ninth aspect of the present preferred embodiment is any of the twenty-first to twenty-eighth aspects of the present preferred embodiment wherein the first and second substrates include a glass plate of which one side is in contact with the liquid crystal layer, and a sheet of optical material disposed to cover a predetermined effective display area on the other side of the glass plate, and the excitation source is disposed in contact with the frame at an edge portion on the other side of the first or second substrate in an area outside the effective display area, and causes the frame to flexurally vibrate according to the sound signal.

This twenty-ninth aspect of the present preferred embodiment enables sound energy resulting from the mechanical vibrations generated by the excitation source to propagate efficiently even in an arrangement in which the excitation source uses primarily the frame as a diaphragm because the excitation source directly causes the frame to flexurally vibrate according to the sound signal.

A thirtieth aspect of the present preferred embodiment is any of the twenty-first to twenty-ninth aspects of the present preferred embodiment wherein the excitation source is disposed at an edge portion of the second substrate on the side thereof not in contact with the liquid crystal layer at a position corresponding to a middle portion of the connection terminal portion.

This thirtieth aspect of the present preferred embodiment uniformly transmits sound energy produced by the mechanical vibrations generated by the excitation source to the LCD module frame even in an arrangement in which the excitation source uses primarily the frame as a diaphragm because the excitation source is disposed at an edge portion on the outside surface of the second substrate at a position corresponding to the middle of the connection terminal portion.

A thirty-first aspect of the present preferred embodiment is the thirtieth aspect of the present preferred embodiment further including a chassis fit to an inside surface on the back side of the frame so as to support the liquid crystal panel, wherein the liquid crystal panel is housed in the frame so that the first substrate is positioned on the front side and the second substrate is positioned on the back side, and the chassis has a thick-walled portion located in corner areas at both end portions of the edge portion on the side of the second substrate that is not in contact with the liquid crystal layer.

This thirty-first aspect of the present preferred embodiment can stably support and secure the liquid crystal panel in the frame and the thick-walled portions stabilize the fit of the chassis and the frame even in an arrangement in which the excitation source uses primarily the frame as a diaphragm because the thick-walled portions located in the corners of the chassis support the liquid crystal panel.

A thirty-second aspect of the present preferred embodiment is the thirty-first aspect of the present preferred embodiment further including a buffer material disposed between the liquid crystal panel and the chassis.

With this thirty-second aspect of the present preferred embodiment, the buffer material disposed between the chassis and liquid crystal panel supports the liquid crystal panel freely and minimizes the inertial mass, and thereby efficiently minimizes or eliminates the transmission of vibrations from other portions of the LCD module to the liquid crystal panel.

A thirty-third aspect of the present preferred embodiment is the thirty-first aspect of the present preferred embodiment further including a buffer material disposed between the chassis and the frame.

The buffer material disposed between the frame of the LCD module and the chassis in this thirty-third aspect of the present preferred embodiment freely supports both the chassis and the liquid crystal panel in contact with each other, and minimizes or eliminates the transmission of vibrations through the frame to the liquid crystal panel while the chassis continues to securely hold the liquid crystal panel.

A thirty-fourth aspect of the present preferred embodiment is any of the twenty-first to thirty-third aspects of the present preferred embodiment further including at least one other excitation source in addition to the excitation source, wherein the other excitation source causes the frame to flexurally vibrate according to an externally supplied sound signal.

By thus providing a plurality of excitation sources, this thirty-fourth aspect of the present preferred embodiment can produce high sound volume even in an arrangement in which the excitation source uses primarily the frame as a diaphragm by applying the same sound signal to the plurality of excitation sources.

A thirty-fifth aspect of the present preferred embodiment is an electronic device including a liquid crystal display device according to any of the twenty-first to thirty-fourth aspects of the present preferred embodiment.

This thirty-fifth aspect of the present preferred embodiment achieves the same effects as the twenty-first to thirty-fourth aspects of the present preferred embodiment.

Other features, elements, characteristics and advantages will become more apparent from the following detailed description of preferred embodiments of the present invention with reference to the attached drawings.

DETAILED DESCRIPTION OF PREFERRED EMBODIMENTS

Preferred embodiments of the present invention are described in detail below with reference to the accompanying drawings.

First Preferred Embodiment

Figure 1:
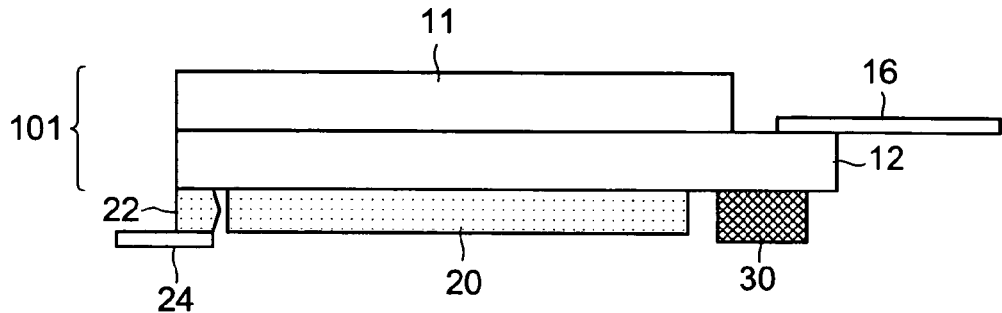
FIG. 1 is a side view showing a liquid crystal panel and associated parts in an LCD device according to a first preferred embodiment of the present invention.
Figure 2:
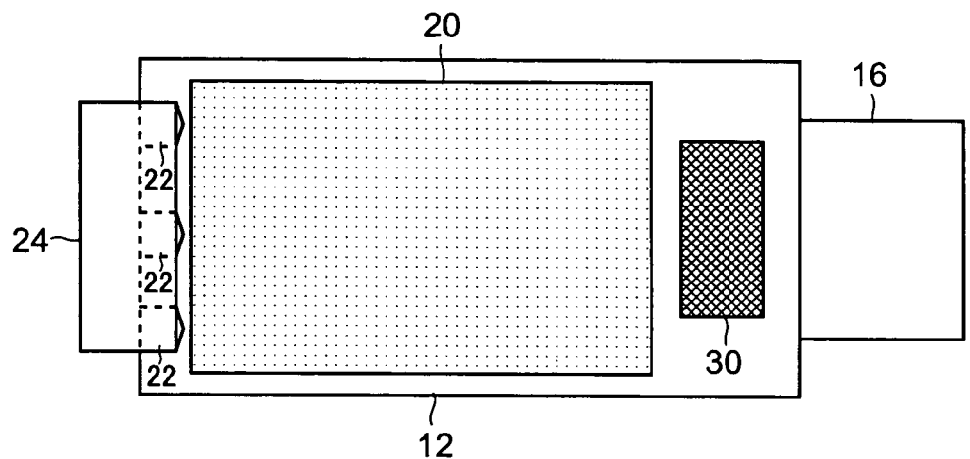
FIG. 2 is a bottom view from the back side of the LC panel in the first preferred embodiment of the present invention.

FIG. 1 is a side view showing the liquid crystal panel and the light guide plate, light source, and other parts associated therewith in a liquid crystal display device according to a first preferred embodiment of the present invention, and FIG. 2 is a bottom view of the LC panel shown in FIG. 1 as seen from the back side thereof. This LCD device 201 (see FIGS. 5 and 6) is preferably used as a liquid crystal display module in a portable electronic device such as a cell phone or PDA, and has a sound output function, that is, a speaker function, in addition to an image display function.

A liquid crystal panel 101 in this preferred embodiment of the present invention has a first substrate 11 and a second substrate 12 arranged to define a pair of opposing substrates. These substrates are fixed with a predetermined gap therebetween (typically several tens of microns). This gap is filled with a liquid crystal material, forming a liquid crystal layer. This LC panel 101 is transparent or semi-transparent. For example, each of substrates 11, 12 includes a glass plate in contact with the liquid crystal layer on one side and a polarizer laminated to the other side of this glass plate (on the side not in contact with the liquid crystal layer). A circuit including a plurality of mutually parallel scanning electrodes, a plurality of signal electrodes perpendicularly intersecting the plurality of scanning electrodes, and a pixel electrode and thin-film transistor (TFT) disposed at each node of the intersections of the multiple scanning electrodes and the multiple signal electrodes is formed using a polycrystalline silicon thin film on one of the substrates 11, 12, specifically on the side of the second substrate 12 in contact with the liquid crystal layer in this preferred embodiment of the present invention. A flexible printed circuit ("FPC" below) 16 is connected to the edge portion of the second substrate 12. The signals required to display images are supplied by this FPC 16 to the LC panel 101. A common electrode is disposed as the opposite electrode over the entire surface of the first substrate 11 on the side thereof in contact with the liquid crystal layer, and an appropriate voltage is applied to this common electrode. A voltage equivalent to the potential difference between the pixel electrode and common electrode is thus applied to the liquid crystal layer, and the light transmittance of the liquid crystal layer is controlled by this applied voltage. As a result, a desired image can be displayed by the LC panel 101 based on the signals supplied from this FPC 16.

The drive signals applied to the scanning electrodes and signal electrodes can be supplied by the FPC 16 to the LC panel 101, but the drive circuit for generating these drive signals is preferably provided on the second substrate 12 integrally with the TFT, for example. In this preferred embodiment, therefore, this drive circuit is formed integrally with the TFT on the second substrate 12 by means of a polycrystalline silicon thin film.

A light guide plate 20 is disposed behind the image display surface of this LC panel 101 on the side of the second substrate 12 that is not in contact with the liquid crystal layer, and an LED 22 is disposed as the light source near the side of the light guide plate 20. Light emitted from the LED 22 is thus guided from the side through the light guide plate 20, travels through the light guide plate 20, and is emitted in the direction of the first substrate 11, that is, to the image display side, thereby illuminating the liquid crystal layer inside the LC panel 101. An image is displayed on the LC panel 101 by controlling the light transmittance of the liquid crystal layer as described above so that the light transmittance varies according to the drive signals. Note that the light source used for illuminating the LC panel 101 shall not be limited to an LED, and a cold cathode tube could be used instead of an LED, for example.

Figure 3:
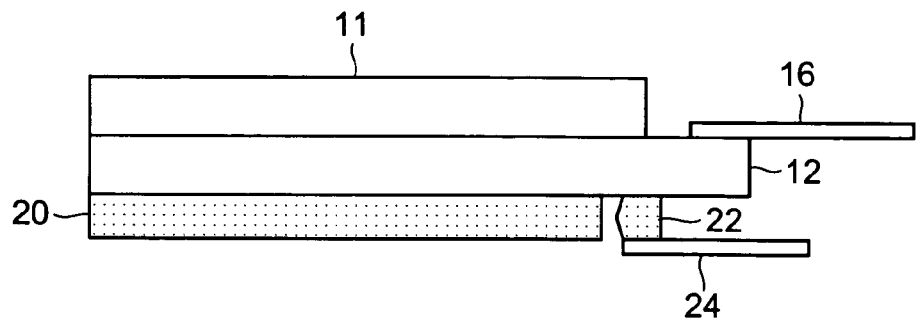
FIG. 3 is a side view showing the liquid crystal panel and associated parts in an LCD device according to the prior art.

The LED 22 used as the light source is conventionally disposed on the back side of the second substrate 12 in the same area as where the FPC 16 is connected as shown in FIG. 3, that is, at the edge portion on the side of the second substrate 12 not contacting the liquid crystal layer in substantially the same area as the FPC 16 connector. However, an LCD device according to the present preferred embodiment of the present invention has an internal excitation source 30 for converting a sound signal (electrical signal) to mechanical vibrations in order to achieve a sound output function. Sound is then output from this LC panel 101 by driving the excitation source 30 to cause the second substrate 12 of the LC panel 101 to vibrate. This excitation source 30 could be manufactured using a piezoelectric element made from quartz, Rochelle salt crystals, or a ceramic thin plate, for example.

As described above, a sound output function (speaker function) is achieved by using an excitation source 30 to make the second substrate 12 vibrate. The resulting problem is that adding this excitation source 30 to a conventional arrangement such as that shown in FIG. 3 leads to an increase in the external size of the portable electronic device in which the LCD device is used (such as a cell phone or PDA). The present preferred embodiment, therefore, disposes the excitation source 30 on the opposite side of the second substrate 12 of the LC panel 101 as the connector portion of the FPC 16, that is, in the edge portion on the surface of the second substrate 12 not in contact with the liquid crystal layer (the "outside surface" below) in the area substantially opposite the connector portion of the FPC 16. In addition, the LED 22 light source is disposed on the opposite side of the light guide plate 20 from the side near where the LED 22 is located in the conventional arrangement shown in FIG. 3. The excitation source 30 and LED 22 are thus disposed with the light guide plate 20 therebetween in the present preferred embodiment of the present invention. Because the area needed to provide the LED 22 is sufficiently small relative to the area on the back side of the second substrate 12 opposite the connector portion of the FPC 16, the external size can be expected not to increase even if the installation space needed for the LED 22 is moved to a different edge area than the edge area opposite the connector portion. Note further that in the prior art example shown in FIG. 3, the LED 22 is electrically connected via an FPC 24 disposed parallel to the back or side of the FPC 16, but the LED 22 in the present preferred embodiment of the present invention is electrically connected by way of an FPC 24 disposed on or in the vicinity of the back or side of the edge portion of the second substrate 12 as shown in FIG. 1 and FIG. 2.

By thus disposing the excitation source 30, which is larger than the LED 22, in the area on the back of the second substrate 12 opposite to the connector portion of the FPC 16, that is, in the area where space is available, the overall increase in the external size of the LCD device 201 resulting from addition of the excitation source 30 is reliably prevented.

Figure 4:
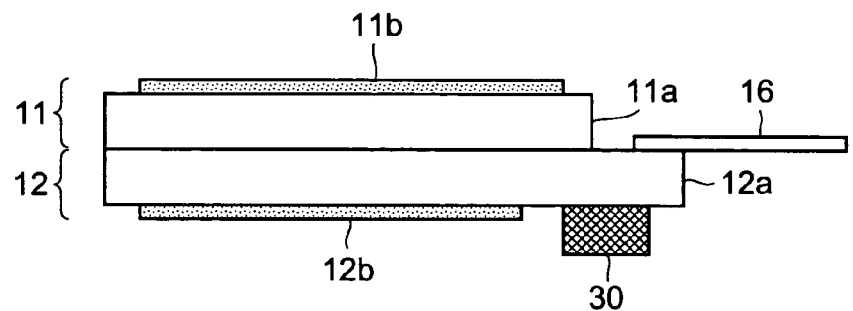
FIG. 4 is a detailed side view showing the arrangement of an LC panel in the first preferred embodiment of the present invention.

FIG. 4 is a side view showing one detailed example of the arrangement of the LC panel 101 in the present preferred embodiment of the present invention. As described above, the first and second substrates 11, 12 of the LC panel 101 each include a polarizer layer provided on a glass substrate, for example. In the arrangement shown in FIG. 4, the first substrate 11 of the LC panel 101 includes a first glass substrate 11*a* and a first polarizer 11*b*, and the second substrate 12 includes a second glass substrate 12*a* and a second polarizer 12*b*. The liquid crystal layer is provided between the first glass substrate 11*a* and second glass substrate 12*a*, the first polarizer 11*b* is bonded to the surface of the first glass substrate 11*a* not in contact with the liquid crystal layer (the "outside surface" below), and the second polarizer 12*b* is bonded to the side of the second glass substrate 12*a* not in contact with the liquid crystal layer (the "outside surface" below). The excitation source 30 is thus disposed at the outside surface of the second glass substrate 12*a* in the edge portion on side opposite to the connector portion of the FPC 16. The second polarizer 12*b* also does not need to cover the entire outside surface of the second glass substrate 12*a*, and only needs to cover the effective display area of the liquid crystal panel. By thus not disposing the second polarizer 12*b* in the area outside the effective display area, the second polarizer 12*b* is located outside of the area of the excitation source 30 as shown in FIG. 4.

Because the polarizer 12*b* is preferably made from a soft material such as plastic, the mechanical vibrations produced by the excitation source 30 based on an external sound signal will be attenuated if the excitation source 30 is disposed in contact with the polarizer 12*b*. However, with the arrangement shown in FIG. 4, the excitation source 30 directly causes the hard second glass substrate 12*a* to flexurally vibrate according to the sound signal, and the sound energy produced by the mechanical vibrations produced by the excitation source 30 are propagated efficiently.

It should be noted that while the polarizer 12*b* is affixed to the outside surface of the second substrate 12 in the foregoing arrangement, a reflection or phase difference plate may be bonded to the outside surface of the second substrate 12 depending upon the display method (transparent or semitransparent) of the LCD device. In such arrangements, the reflection or phase difference plate is also preferably disposed so as to not cover where the excitation source 30 is disposed. This is because sound energy will not propagate efficiently if the area of the excitation source 30 is covered by the soft sheet-like optical material of the polarizer, reflector, or phase difference plate.

Figure 5:
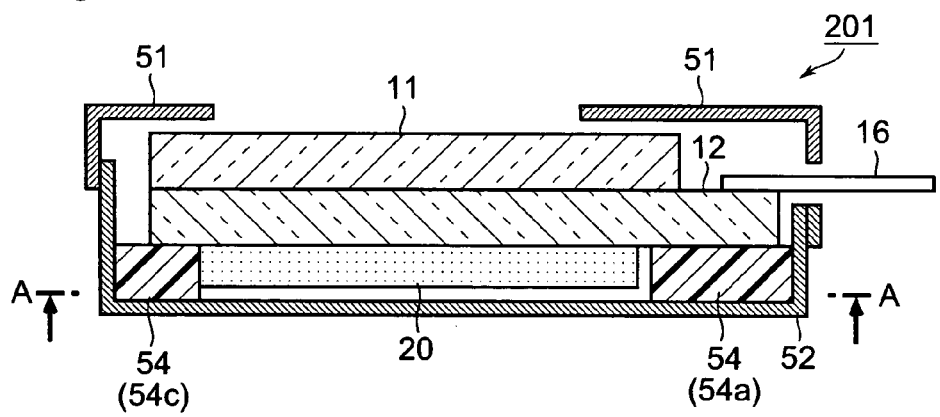
FIG. 5 is a longitudinal section view of an LCD device according to the first preferred embodiment of the present invention.
Figure 6:
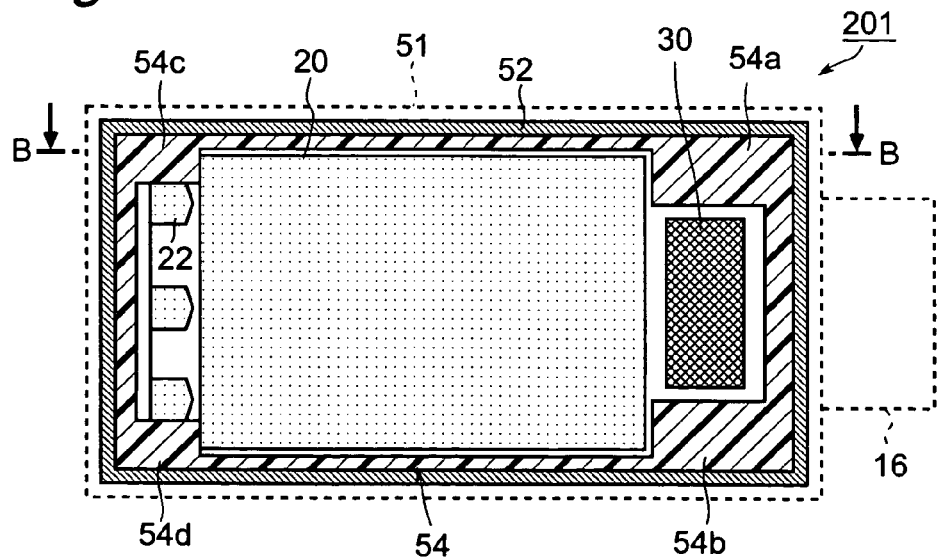
FIG. 6 is a side section view through line A-A in FIG. 5.

FIG. 5 is a longitudinal section view showing an LCD device according to the present preferred embodiment of the present invention, and FIG. 6 is a section view (lateral section view) through line A-A in FIG. 5. FIG. 5 is a section view through line B-B in FIG. 6.

This LCD device 201 is preferably used as a liquid crystal display module in electronic devices such as cell phones and PDAs as noted above, and the main parts of the LCD device 201 include the LC panel 101 and associated light guide plate 20, LED 22, and excitation source 30 (referred to below as the "LCD module"). The frame of the LCD module includes a front bezel 51 and rear bezel 52 each preferably made from metal using a press, for example, and a plastic chassis 54 is fit into the rear bezel 52. The LCD module is supported inside the frame by the chassis 54.

As shown in FIG. 6, the excitation source 30 used to achieve the sound output function (speaker function) in the present preferred embodiment of the present invention is located on the back side of the second substrate 12 opposite the connector portion of the FPC 16 (on the side not in contact with the liquid crystal layer) in the portion corresponding to the middle of the connector portion. As a result, the LC panel 101 is supported by the chassis 54 at both end portions outside the area of the excitation source 30 (the middle between the end portions) in the edge portions of the second substrate 12 outside the display area on the back side thereof opposite the connector portion of the FPC 16. More specifically, thick-walled portions 54*a*, 54*b* of the chassis 54 are located in the portions corresponding to the four corners of the LCD device 201 at both end edge portions of the second substrate 12. Thick-walled portions 54*c*, 54*d* are also provided in the other portions of the four corners of the LCD device 201 (the corner areas at the edges on the side where the LED 22 is disposed at the second substrate 12).

In the present preferred embodiment of the present invention as described above, the second substrate 12 of the LC panel is used as the diaphragm for producing sound, the excitation source 30 is disposed in the area on the back of the second substrate 12 opposite the connector portion of the FPC 16, that is, in an area where there is available space, and the LED 22 light source is disposed at a position opposite the excitation source 30 with the light guide plate 20 therebetween. As a result, an increase in the external size resulting from adding an excitation source 30 can be prevented in a transparent or semi-transparent LCD device. More specifically, a sound output function can be added to an LCD device while avoiding an increase in the external size or minimizing any increase in the external size.

Furthermore, because the second substrate 12 of the LC panel is used as the speaker diaphragm in the present preferred embodiment of the present invention, a separate diaphragm for sound output does not need to be provided in front of the display. There is, therefore, no drop in transmittance resulting from adding a sound output function, and any drop in the image display quality can be avoided.

Furthermore, because the excitation source 30 is disposed on the back of the second substrate 12 in the middle of the connector portion of the FPC 16, that is, in the middle of a specific edge portion of the second substrate 12, sound energy from mechanical vibrations produced by the excitation source 30 can be evenly transmitted to the LC panel 101. Yet further, because thick-walled portions of the chassis 54 that support the LC panel 101 are provided at the four corners of the LCD device 201 in conjunction with the foregoing location of the excitation source 30, a consistent fit can be assured between the chassis 54 and the rear bezel 52 and between the front bezel 51 and the rear bezel 52, and the LC panel 101 can be stably supported and secured. As a result, durability with respect to vibration and impact can be improved in the LCD device 201 and an electronic device including the same.

Second Preferred Embodiment

Figure 7:
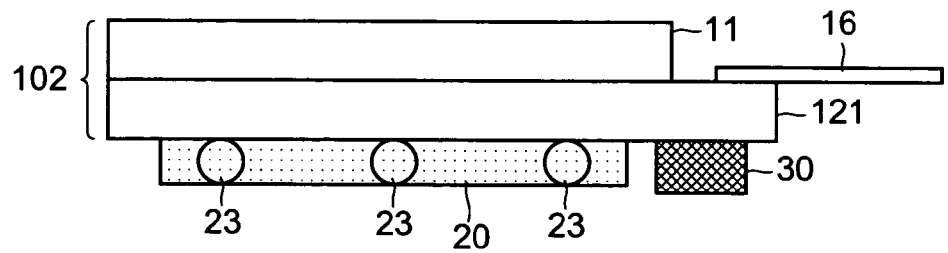
FIG. 7 is a side view showing the liquid crystal panel and associated parts in an LCD device according to a second preferred embodiment of the present invention.
Figure 8:
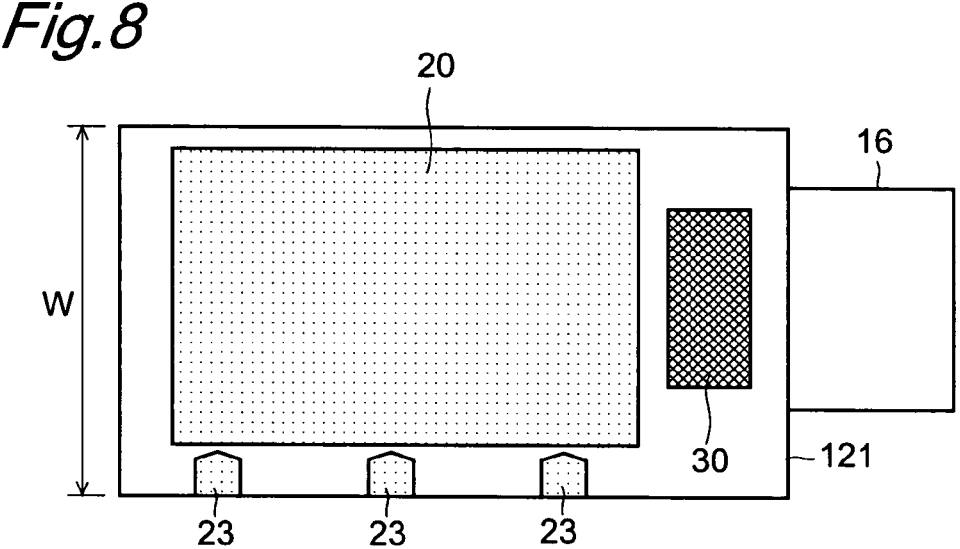
FIG. 8 is a bottom view showing the liquid crystal panel and associated parts in the second preferred embodiment of the present invention.
Figure 9:
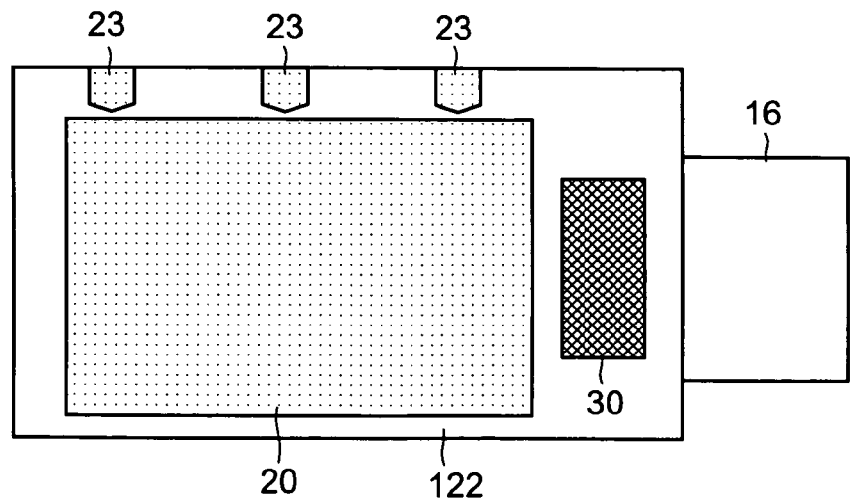
FIG. 9 is a bottom view showing another arrangement of the liquid crystal panel and associated parts in the second preferred embodiment of the present invention.

FIG. 7 is a side view showing the liquid crystal panel and associated parts in an LCD device according to a second preferred embodiment of the present invention, that is, a side view of the LCD module, and FIG. 8 is a bottom view of the back of this LCD module.

As in the first preferred embodiment, an LC panel 102 according to the present preferred embodiment of the present invention preferably includes a pair of opposing substrates, a first substrate 11 and a second substrate 121. These substrates are fixed with a specific gap (typically several tens of microns) therebetween and have a liquid crystal layer formed by filling this gap between the substrates with a liquid crystal material. The LC panel 102 is also transparent or semi-transparent. Also as in the first preferred embodiment, an FPC 16 for supplying the signals required to display an image to the LC panel 102 is connected to the edge portion of the second substrate 121, and a light guide plate 20 is disposed on the side (the outside surface) of the second substrate 121 that is not in contact with the liquid crystal layer. The excitation source 30 for flexurally vibrating the second substrate 121 to output sound is also disposed in the same position as in the first preferred embodiment (that is, on the back side of the second substrate 121 of the LC panel 102 opposite the connector portion of the FPC 16).

In the present preferred embodiment, however, the drive circuit generating the drive signal for displaying images on the LC panel 102 is provided in a semiconductor integrated circuit chip ("IC chip" below), and thus differs from the first preferred embodiment in which the drive circuit is formed integrally with the TFT using a polycrystalline silicon thin film, for example, on the second substrate 12. Space for mounting this IC chip drive circuit (which is mounted as a bare chip) on the second substrate 121 is therefore reserved on the second substrate 121, and the width W (the distance from top to bottom as seen in FIG. 8) of this second substrate 121 is therefore greater than the width of the second substrate 12 in the first preferred embodiment. Using this space, the LED 23 light source is disposed on the back side of the area on the second substrate 121 where the IC chip drive circuit is mounted.

As shown in FIG. 8, the LED 23 in the present preferred embodiment is not located opposite the excitation source 30, but instead is located along the side of the light guide plate 20 (the side along the bottom as seen in FIG. 8) adjacent to the side near where the excitation source 30 is disposed so that light enters the light guide plate 20 from this bottom side edge. Note that if the IC chip drive circuit is mounted along the top side 122, the LED 23 is also located along this top edge portion on the back side of the area where the IC chip is disposed at the second substrate 121.

In the present preferred embodiment of the present invention, the second substrate 121 of the LC panel is used as the diaphragm for sound output, the excitation source 30 is disposed at the area on the back of the second substrate 121 opposite the connector portion of the FPC 16, that is, where space is available, and the LED 23 light source is disposed along the bottom edge portion of the second substrate 121 in the area on the side opposite where the IC chip is located (see FIG. 8).

As in the first preferred embodiment, a sound output function can thus be added to a transparent or semi-transparent LCD device having an IC chip drive circuit mounted on a substrate of the LC panel while avoiding an increase in the external size or minimizing any increase in the external size.

Third Preferred Embodiment

Figure 10:
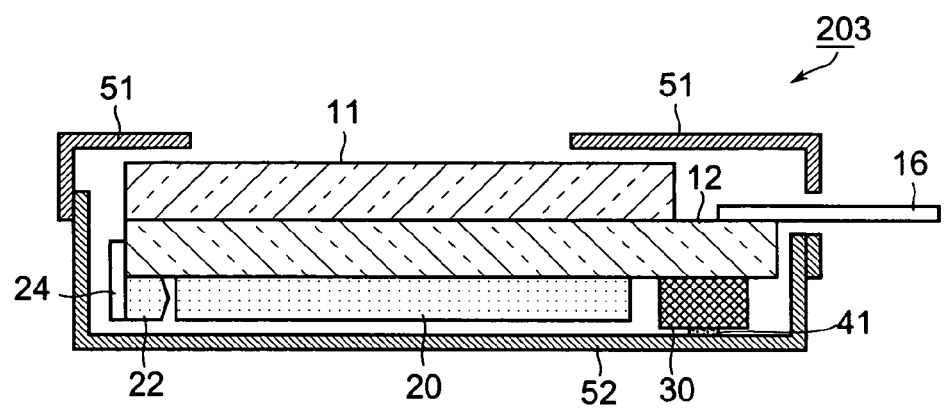
FIG. 10 is a longitudinal section view of an LCD device according to a third preferred embodiment of the present invention.

FIG. 10 is a longitudinal section view of an LCD device according to a third preferred embodiment of the present invention. Note that the chassis is omitted in FIG. 10 for simplicity.

As in the first preferred embodiment, this LCD device 203 is also used as a transparent or semi-transparent LCD module in a portable electronic device such as a cell phone or PDA, and has a sound output function (speaker function) in addition to an image display function. This sound output function is achieved by the excitation source 30 causing a substrate of the LC panel to flexurally vibrate according to a sound signal.

In the present preferred embodiment as shown in FIG. 10, however, the excitation source 30 is disposed in a position from which the excitation source 30 can cause the second substrate 12 of the LC panel to flexurally vibrate and is also mechanically bonded by an adhesive 41 to the rear bezel 52 so that the excitation source 30 can also cause the rear bezel 52 to flexurally vibrate. Other aspects of the arrangement of the present preferred embodiment are preferably substantially the same as in the first preferred embodiment, like parts are identified by like reference numerals, and further description thereof is thus omitted here. However, the FPC 24 whereby the LED 22 is electrically connected is disposed at and near the side of the second substrate 12 instead of as shown in FIG. 1.

In addition to causing the second substrate 12 of the LC panel to flexurally vibrate, the excitation source 30 in the present preferred embodiment thus arranged also causes the rear bezel 52, which is part of the frame of the LCD module, to flexurally vibrate, according to the externally supplied sound signal. The energy used for sound output can thus be efficiently used because the sound energy resulting from the mechanical vibrations produced by the excitation source 30 according to the sound signal is propagated to both the second substrate 12 and the rear bezel 52. As a result, power consumption by the LCD device 203 and an electronic device including this LCD device 203 can be reduced while assuring sound output with sufficient volume.

The excitation source 30 is mechanically fixed to the rear bezel 52 preferably via an adhesive 41, for example, in this third preferred embodiment as described above. However, the height of the thick-walled portion of the chassis 54 (not shown in FIG. 10, see FIG. 5) and the height of the rear bezel 52 could instead be adjusted or set appropriately so that the excitation source 30 touches the rear bezel 52, thereby enabling the excitation source 30 to make the rear bezel 52 flexurally vibrate.

Fourth Preferred Embodiment

Figure 11:
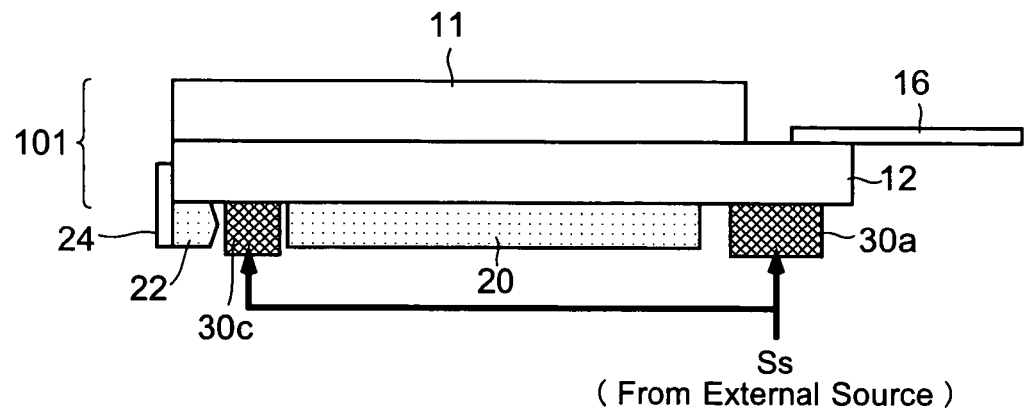
FIG. 11 is a side view showing a liquid crystal panel and associated parts in an LCD device according to a fourth preferred embodiment of the present invention.
Figure 12:
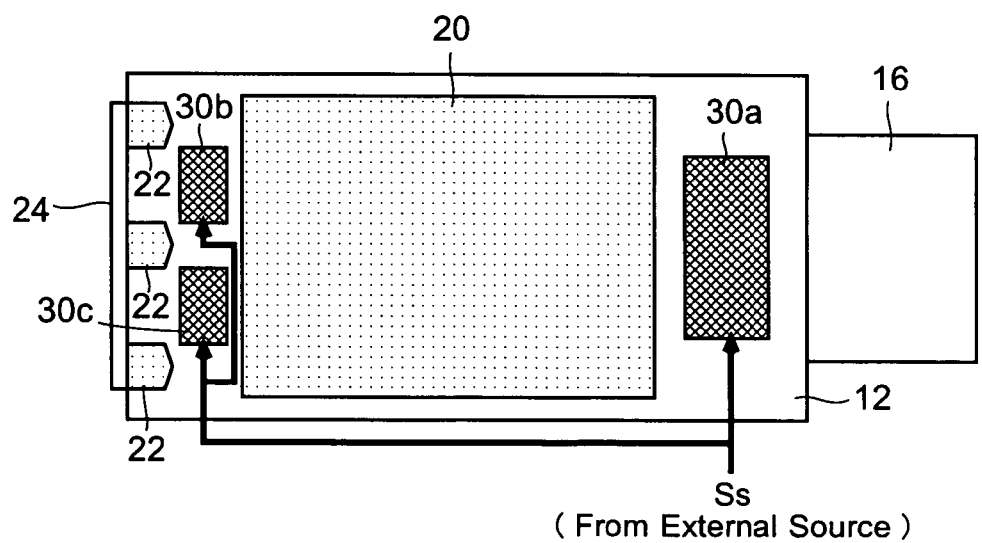
FIG. 12 is a bottom view showing the liquid crystal panel and associated parts in the fourth preferred embodiment of the present invention.

FIG. 11 is a side view showing the liquid crystal panel and associated parts in an LCD device according to a fourth preferred embodiment of the present invention, that is, a side view of the LCD module, and FIG. 12 is a bottom view of the back of this LCD module.

In the present preferred embodiment of the present invention, an excitation source identical to the excitation source 30 in the first preferred embodiment is disposed as a main excitation source 30a in the same location as the excitation source 30 in the first preferred embodiment, and two excitation sources that are smaller than the main excitation source 30a, that is, first complementary excitation source 30b and second complementary excitation source 30c, are also provided. Other aspects of the arrangement of this preferred embodiment are preferably substantially the same as in the first preferred embodiment, like parts are identified by like reference numerals, and further description thereof is thus omitted here. However, the FPC 24 whereby the LED 22 is electrically connected is disposed at and near the side of the second substrate 12 instead of as shown in FIG. 1.

In the arrangement shown in FIG. 11 and FIG. 12, the first and second complementary excitation sources 30b and 30c are disposed on the outside surface of the second substrate 12 on the opposite side of the light guide plate 20 as the main excitation source 30a, but the location of the first and second complementary excitation sources 30b, 30c shall not be so limited. Although the complementary excitation sources 30b, 30c are preferably smaller than the main excitation source 30a in this preferred embodiment, a plurality of excitation sources of the same size could be used. The number of excitation sources shall also not be limited to three. This also applies to the other preferred embodiments of the present invention. However, for simplicity below we assume that three excitation sources 30a, 30b, 30c of the sizes shown in FIG. 11 and FIG. 12 are disposed at the locations shown in the same figures when the LCD device includes a plurality of excitation sources.

The same sound signal Ss is input from a source external to the LCD device to the three excitation sources 30a to 30c in this preferred embodiment. As a result, the main excitation source 30a and the complementary excitation sources 30b, 30c also drive the second substrate 12 of the LC panel to flexurally vibrate according to the sound signal Ss. Higher sound output can therefore be achieved than when only one excitation source is used as in the first preferred embodiment. More specifically, the gain of the sound output to the input sound signal Ss can be improved.

The same sound signal Ss is preferably applied to the three excitation sources 30a to 30c in this preferred embodiment, but different sound signals could be externally applied to these three excitation sources 30a to 30c. Sound from completely different signal sources can thus be output from the excitation sources 30a to 30c, and the function of a sound mixer can thus be provided in the LC panel. Furthermore, separately controlling the sound signals input to the three excitation sources 30a to 30c makes it possible to achieve stereophonic reproduction and control which portion of the LC panel produces sound (this latter arrangement is described below as the fifth preferred embodiment).

Fifth Preferred Embodiment

As described above, which portion of the LC panel produces sound can be controlled by providing a plurality of excitation sources in the LCD device and applying different sound signals to the excitation sources. In this case, the LCD device is arranged so that multiple sound signals of different phase and amplitude (level) originating from the same signal source can be input to the plurality of excitation sources, and the phase and amplitude of the sound signals can be controlled. By thus varying the phase and amplitude of the sound signals input to the plurality of excitation sources, the vibrations produced from the plural excitation sources are increased and decreased by mutual interference in the two-dimensional plane of the LC panel. As a result, the strongest sound waves are produced in the air around the position of the strongest vibrations in this two-dimensional plane. This position can be called the "sound output position" of the LC panel, and this sound output position can be controlled by controlling the phase and amplitude of the sound signals. An electronic device having an LCD device with a sound output function thus enabling controlling the sound output position is described below as a fifth preferred embodiment of the present invention.

Figure 13:
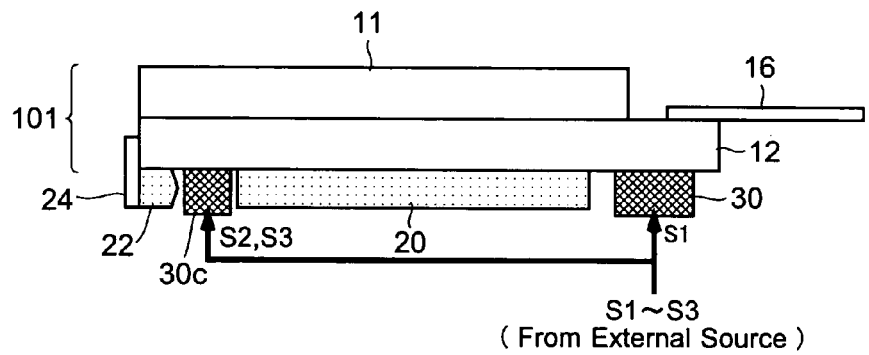
FIG. 13 is a side view showing a liquid crystal panel and associated parts in an LCD device used in an electronic device according to a fifth preferred embodiment of the present invention.
Figure 14:
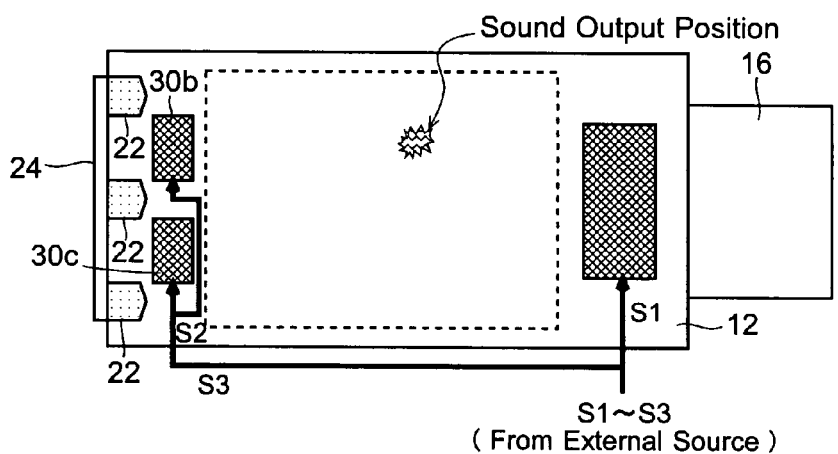
FIG. 14 is a bottom view showing the liquid crystal panel and associated parts in the fifth preferred embodiment of the present invention.
Figure 15:
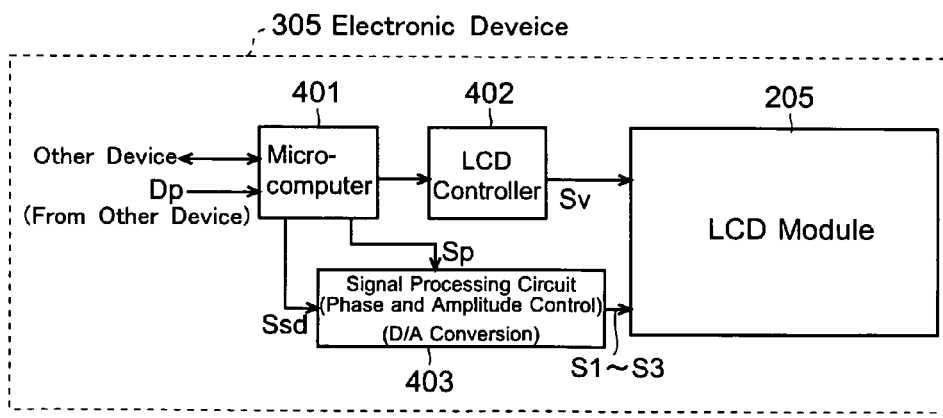
FIG. 15 is a function block diagram showing main components of the electronic device according to the fifth preferred embodiment of the present invention.

FIG. 13 is a side view showing the liquid crystal panel and associated parts in an LCD device used in an electronic device according to the present preferred embodiment, that is, FIG. 13 is a side view of the LCD module in this preferred embodiment of the present invention. FIG. 14 is a bottom view showing the back of this LCD module, and FIG. 15 is a function block diagram showing the main components of an electronic device according to this preferred embodiment of the invention. Note that the light guide plate 20 is omitted from FIG. 14 for simplicity of description.

As shown in FIG. 15, an electronic device 305 according to this preferred embodiment of the present invention has an LCD module 205, an LCD controller 402 for supplying image signal Sv to this LCD module 205 and controlling image display on the LCD module 205, a signal processing circuit 403 for outputting signals S1 to S3 of the sound to be produced using the sound output function of the LCD module 205, and a microcomputer 401 for supplying digital image data to the LCD controller 402 and supplying sound data Ssd to the signal processing circuit 403.

The LCD device shown in FIG. 13 and FIG. 14 is used as the LCD module 205 of the electronic device 305 arranged as described above, and the different sound signals S1 to S3 are supplied to the three excitation sources 30a to 30c from a signal processing circuit 403 external to the LCD device. Other aspects of the arrangement of this preferred embodiment are preferably substantially the same as in the fourth preferred embodiment shown in FIG. 11 and FIG. 12, like parts are thus identified by like reference numerals, and further description thereof is omitted here.

In this preferred embodiment of the present invention, the LCD controller 402 supplies image signal Sv to the LCD module 205 based on data supplied from the microcomputer 401. In the LCD module (LCD device) 205, this image signal Sv is applied through the FPC 16 to the LC panel 101, and the LC panel 101 thus presents the image represented by the image signal Sv. The LCD module 205 can also output sound in parallel with this image display. More specifically, based on data Dp from an input device or other device in the electronic device 305, the microcomputer 401 applies a signal Sp (the "sound position signal" below) denoting the sound output position in the (image display surface of the) LC panel 101 to the signal processing circuit 403 together with the sound data Ssd.

The signal processing circuit 403 generates an analog sound signal by D/A conversion of this sound data Ssd and varies the phase and amplitude of this sound signal based on the sound position signal Sp, thereby generating three different sound signals S1 to S3 of mutually different phase and amplitude and supplying these sound signals S1 to S3 to the LCD module 205.

In the LCD module 205, the sound signals S1 to S3 are applied to the excitation sources 30a to 30c, respectively. The excitation sources 30a to 30c then cause the second substrate 12 of the LC panel to vibrate at their respective locations according to the sound signals S1 to S3 applied thereto. As a result, flexural vibrations produced from the locations of the excitation sources 30a to 30c travel through the second substrate 12, and the vibrations interfere with each other on the second substrate, thereby determining the location of the strongest vibrations on the outside surface of the second substrate 12. This means that the sound output position is determined by the differences in phase and amplitude between the sound signals S1 to S3. That is, the sound output position in the outside surface of the second substrate 12, that is, the sound output position of the LC panel, can be controlled by using the signal processing circuit 403 to control the phase and amplitude of the sound signals S1 to S3 according to the sound position signal Sp.

Sixth Preferred Embodiment

Images displayed on the LC panel can be linked to the sound output position of the LC panel in the foregoing fifth preferred embodiment of the present invention by controlling the phase and amplitude of the sound signals S1 to S3 according to the image displayed on the LC panel based on the image signal Sv. An electronic device including this type of LCD module is described below as a sixth preferred embodiment of the present invention.

Figure 16:
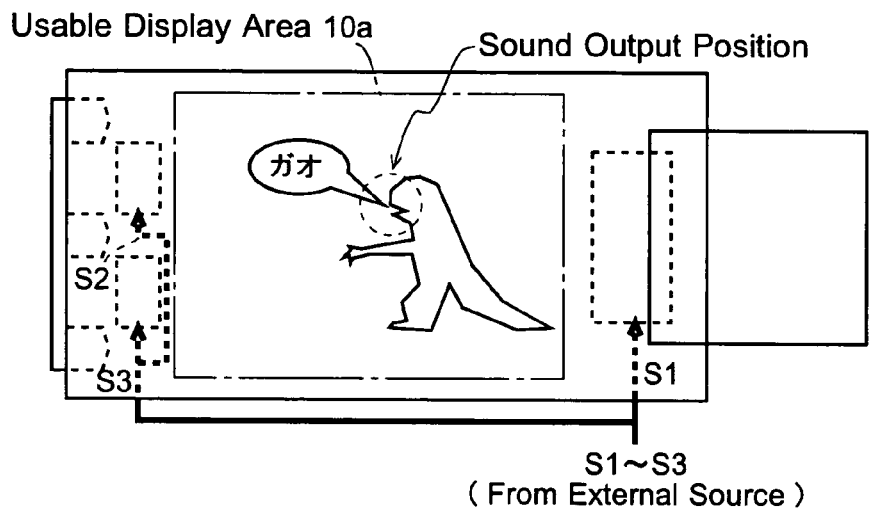
FIG. 16 is a plan view showing an LC panel in an LCD device used in an electronic device according to a sixth preferred embodiment of the present invention.
Figure 17:
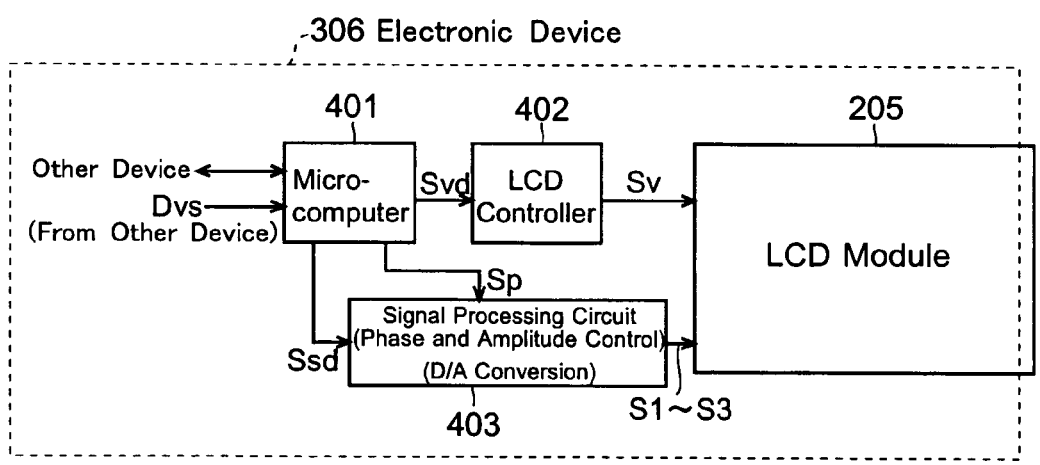
FIG. 17 is a function block diagram showing main components of the electronic device according to the sixth preferred embodiment of the present invention.

FIG. 16 is a plan view showing the liquid crystal panel and associated parts in an LCD device used in an electronic device according to the present preferred embodiment of the present invention, that is, a plan view as seen from the front of the LCD module in the present preferred embodiment of the present invention, and FIG. 17 is a function block diagram showing the main parts in an electronic device according to the present preferred embodiment of the present invention.

As shown in FIG. 17, the hardware configuration of an electronic device 306 according to this preferred embodiment of the present invention preferably is basically the same as that of the fifth preferred embodiment shown in FIG. 15, like parts are therefore identified by like reference numerals, and further description thereof is omitted here. In the present preferred embodiment, the microcomputer 401 receives data (referred to as "combined data" below) Dvs combining the image data with position data from an input device or other device inside the electronic device 306. This combined data Dvs represents the image to be displayed on the LCD module 205 and includes data denoting the sound output position in the displayed image as tag information. MPEG-7, for example, provides a structural framework for adding this sound output position to image data.

When the microcomputer 401 receives this combined data Dvs, the microcomputer 401 separates the image data Svd from the combined data Dvs and applies the image data Svd to the LCD controller 402 based on a program stored in memory in the microcomputer 401. Based on this image data Svd, the LCD controller 402 supplies the image signal Sv to the LCD module 205. The LCD module (LCD device) 205 then presents the image represented by the image signal Sv on the LC panel 101. Based on the same program, the microcomputer 401 also extracts the position data from the combined data Dvs and generates sound position signal Sp, supplies this signal to the signal processing circuit 403 and also supplies the sound data Ssd to the signal processing circuit 403. The signal processing circuit 403 acquires an analog sound signal by D/A converting the sound data Ssd and varies the phase and amplitude of this sound signal based on the sound position signal Sp to generate three sound signals S1 to S3 of mutually different phase and amplitude, and supplies these sound signals S1 to S3 to the LCD module 205. The excitation sources 30a to 30c of the LCD module 205 then cause the second substrate 12 of the LC panel to vibrate at their respective positions based on the sound signals S1 to S3 applied thereto. As a result, the sound represented by the sound data Ssd is produced at the locations in the image presented on the LC panel indicated by the position data in the combined data Dvs input to the microcomputer 401 based on the same principle described in the foregoing fifth preferred embodiment.

In addition to linking a displayed image with the output sound, the present preferred embodiment of the present invention can thus also link where sound is produced in the LC panel to the image displayed on the LC panel. As a result, the image of a monster, for example, can be displayed on the LC panel and sound can be output from the actual position corresponding to the monster's mouth in the usable display area 10a of the LC panel as shown in FIG. 16.

Position data denoting the sound output position in a displayed image is provided together with the image data representing the image to be displayed in the present preferred embodiment of the present invention as described above. Alternatively, however, the sound output position in the image to be displayed can be detected by receiving only the image data and detecting movement in the objects, people, or animals represented in the image data, or by applying an image recognition or image understanding process to the received image data. In this situation the sound position signal Sp applied to the signal processing circuit 403 is generated according to the detection result.

Seventh Preferred Embodiment

Figure 18:
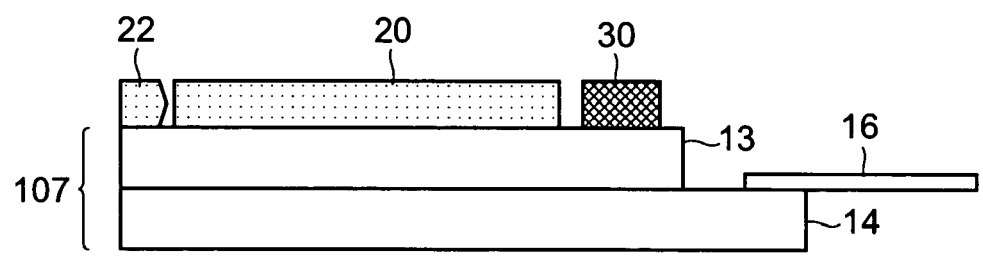
FIG. 18 is a side view showing a liquid crystal panel and associated parts in the LCD device according to the seventh preferred embodiment of the present invention.
Figure 19:
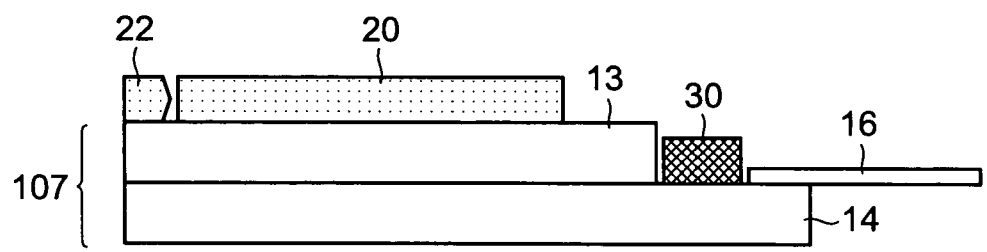
FIG. 19 is a side view showing another arrangement of the LC panel and associated parts in the LCD device according to the seventh preferred embodiment of the present invention.

FIG. 18 is a side view showing the liquid crystal panel and associated parts in an LCD device according to a seventh preferred embodiment of the present invention. The LC panel 107 in this LCD device has a pair of opposing substrates, first substrate 13 and second substrate 14, fixed with a specific gap (typically several microns) therebetween, and a liquid crystal material is filled between these substrates to form a liquid crystal layer. This LC panel 107 is reflective, that is, the first substrate 13 is transparent but a reflective layer is formed over the electrodes on the side of the second substrate 14 in contact with the liquid crystal layer. The light guide plate 20 is then arranged to cover the usable display area on the outside surface of the first substrate 13, and the LED 22 light source and excitation source 30 are disposed in two opposing edge portions of the first substrate 13 with the light guide plate 20 therebetween. Other aspects of the arrangement of this preferred embodiment are preferably substantially the same as in the first preferred embodiment, like parts are identified by like reference numerals, and further description thereof is thus omitted here. Note that the excitation source 30 is disposed at an edge portion of the first substrate 13 in the example shown in FIG. 18, but could be disposed at an edge portion of the second substrate 14 as shown in FIG. 19.

Thus, the excitation source 30 causes the first substrate 13 to flexurally vibrate according to an external sound signal, thereby causing the LC panel 107 to produce sound, and enabling a substrate of the LC panel to be used as a diaphragm for sound output. Furthermore, by disposing the LED 22 light source and excitation source 30 on opposite sides of the light guide plate 20 at positions corresponding to edge portions outside the effective display area of the LC panel, a sound output function can be achieved in a reflective LCD device with a front light unit while preventing any increase in the external size.

Eighth Preferred Embodiment

Figure 20:
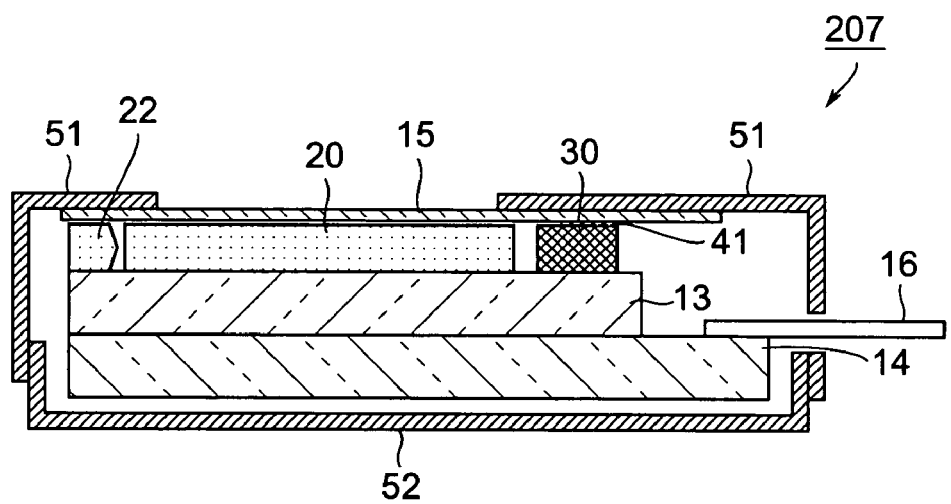
FIG. 20 is a longitudinal section view of an LCD device according to an eighth preferred embodiment of the present invention of the present invention.

FIG. 20 is a longitudinal section view showing an LCD device according to an eighth preferred embodiment of the present invention. The chassis is omitted from FIG. 20 for simplicity. The frame of an LCD device according to this eighth preferred embodiment of the present invention is preferably substantially the same as in the third preferred embodiment, and the arrangement of the LC panel according to this eighth preferred embodiment is preferably substantially the same as in the seventh preferred embodiment. Like parts are therefore identified by like reference numerals, and further description thereof is thus omitted here. Furthermore, as in the third preferred embodiment, the excitation source 30 in this LCD device 207 is located where the excitation source 30 can cause the LC panel to flexurally vibrate, and is also mechanically connected to the front bezel 51 through an intervening structural panel 15 preferably via an adhesive 41, for example.

Figure 21:
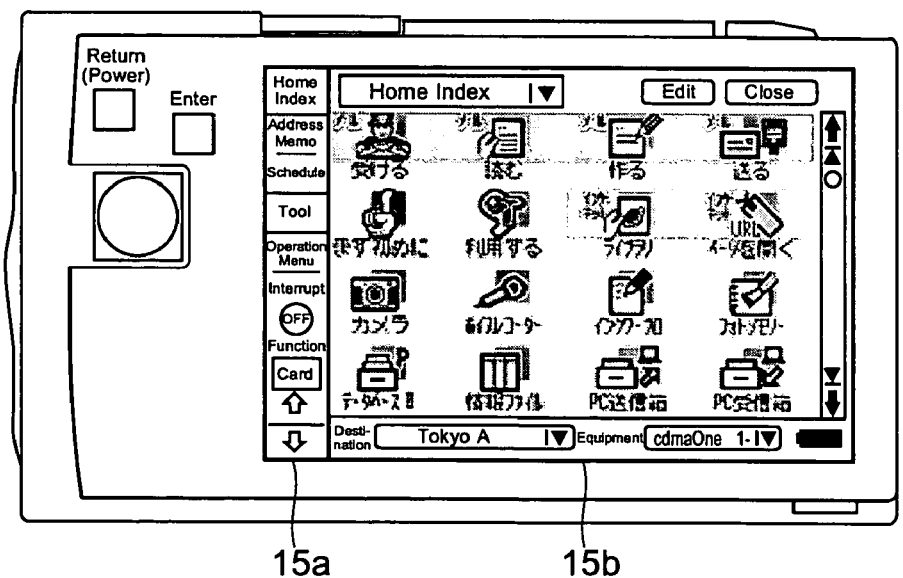
FIG. 21 is a plan view showing the appearance of the electronic device having the LCD device according to the eighth preferred embodiment of the present invention.

In this preferred embodiment of the present invention, the excitation source 30 causes the structural panel 15 located at the surface of the LCD module and the front bezel 51 that is part of the case to flexurally vibrate according to an external sound signal. Examples of this structural panel 15 include a complementary display panel 15a presenting representations of functions or operating controls of an electronic device including this LCD device 207 as an LCD module as shown in FIG. 21, and a surface panel 15b such as a touch panel having a sensor function enabling use as an operating panel. (Note that if the structural panel 15 is a touch panel, the structural panel 15 does not need to cover the entire surface of the LC panel.) The structural panel 15 is one structural part of the LCD device 207. As in the third preferred embodiment, disposing the excitation source 30 between the LC panel and structural panel 15 thus enables the entire module to efficiently use the sound energy generated by the mechanical vibrations produced by the excitation source 30 according to the supplied sound signal. Power consumption by the LCD device 207 and an electronic device including the LCD device 207 can thus be reduced while assuring sufficient sound volume.

The excitation source 30 is mechanically bonded to the structural panel 15 preferably via an adhesive 41 in the example shown in FIG. 20. However, the height of the thick-walled portion of the chassis (not shown in FIG. 20) and the height of the bezel 51 could instead be adjusted or set appropriately so that the excitation source 30 touches the structural panel 15, thereby enabling the excitation source 30 to make the structural panel 15 and bezel 51 flexurally vibrate.

Furthermore, if the structural panel 15 is a complementary display panel such as a touch panel providing an operating unit for the electronic device, the excitation source 30 can also be driven to produce specific vibration patterns for each function displayed graphically on the structural panel 15. In this situation a vibration pattern (the vibration waveform, amplitude, frequency, or combination thereof) is predefined for each function that can be performed by operating the operating panel of the electronic device, that is, a specific vibration pattern is linked to each operation used to execute a specific function. In addition, an operation-dependent signal generator is provided in the electronic device or LCD module. The operation-dependent signal generator generates a signal causing the excitation source 30 to vibrate according to the vibration pattern corresponding to the executed operation and supplies this signal in place of the above-described sound signal to the excitation source 30 when the operator then performs an operation. Improper operation of the device can thus be reduced with this arrangement because the specific vibration patterns thus generated can make the user aware of the result of a particular operation.

When the structural panel 15 is a display panel 15a or surface panel 15b having a sensor function enabling use as an operating unit as shown in FIG. 21, providing this operation-dependent signal generator in the LCD module (LCD device) enables the LCD device itself to cause the excitation source to produce vibrations triggered by a specific operation.

In the arrangement of the present preferred embodiment shown in FIG. 20, the light guide plate 20 is disposed at the display surface side of the LC panel, and the structural panel 15 is disposed between the light guide plate 20 and the bezel 51 with one side of the structural panel 15 in contact with the inside surface of the bezel 51. The present invention shall not be limited to this arrangement, however. In a transparent LCD device having the light guide plate 20 disposed on the back side of the LC panel (that is, the opposite side as the display surface), the structural panel 15 can be disposed between the LC panel and bezel 51 with one side of the structural panel 15 in contact with the inside wall of the bezel 51. In addition to the above-noted display panel 15a and surface panel 15b, the structural panel 15 could be a display panel that has a display function but does not have a sensor function enabling operations (process selection). In this case, a sensor function enabling operation is achieved by making a selection using a separately provided jog wheel or buttons, for example. If a jog wheel is used, an indicator denoting the selection can be simply displayed on the LC panel beside the proper items displayed on the structural panel 15. A structure for generating vibrations corresponding to the selection (that is, an excitation source and a structure for generating the signal supplied to the excitation source) can also be provided in the LCD module in this case.

Ninth Preferred Embodiment

Figure 22:
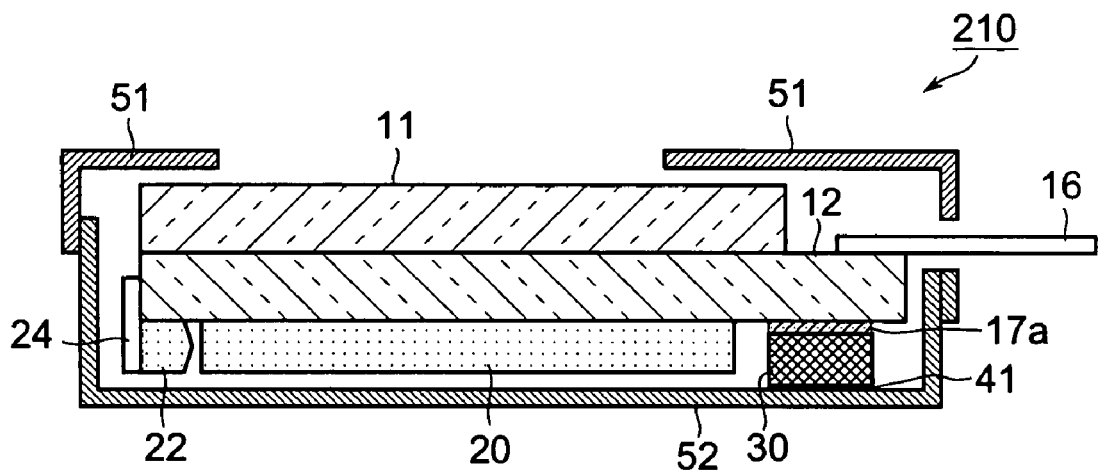
FIG. 22 is a longitudinal section view of an LCD device according to a ninth preferred embodiment of the present invention.

FIG. 22 is a longitudinal section view showing the arrangement of an LCD device according to a ninth preferred embodiment of the present invention. The chassis is omitted from FIG. 22 for simplicity. The frame of an LCD device according to this ninth preferred embodiment of the invention is preferably substantially the same as in the third preferred embodiment, and the arrangement of the LC panel according to this ninth preferred embodiment is preferably substantially the same as in the seventh preferred embodiment. Like parts are therefore identified by like reference numerals, and further description thereof is thus omitted here. Unlike in the third preferred embodiment, the excitation source 30 in this LCD device 210 is separated from the LC panel by an intervening buffer material 17a, and vibrations produced by the excitation source 30 are dampened or cancelled by this buffer material 17a.

This buffer material 17a could be a spongy material such as PORON™, a high-density urethane foam, or a gel material injected between the excitation source 30 and the LC panel. Because the expected vibration stress and amplitude applied to the excitation source 30 are determined by the desired volume of the output sound, the hardness of this sponge material or the viscosity of the gel can be appropriately adjusted according to these expected values when the buffer material 17a is thus provided. Depending upon the hardness of the sponge and the viscosity of the gel, this buffer material 17a also works to secure the excitation source 30 inside the LCD module, thereby helping to improve durability in mobile environments where the device is easily subjected to external stress. The excitation source 30 can be arranged so that the excitation source 30 does not contact the second substrate 12 of the LC panel and leaves a space therebetween. In this arrangement, the buffer material 17a can be treated like an air-filled construction, which thus works to block the transmission of sound vibrations to the LC panel. When the buffer material 17a is thus provided in this space, the propagation of vibrations can be substantially completely stopped. AN LCD module according to this preferred embodiment of the present invention is thus suited to applications that are averse to stress applied to the LC panel surface or to an operating position of a touch sensor in contact with the LC panel surface. An active anti-vibration element that inverts the signal input to the excitation source 30, applies a suitable coefficient, and operates according to the resulting signal could also be used.

As in the third preferred embodiment, the excitation source 30 is mechanically coupled to the bezel 52 preferably by an adhesive 41, for example. Propagation of sound vibrations generated by the excitation source 30 to the LC panel is suppressed as described above, the energy of those sound vibrations is transmitted to the bezel (frame) 52 to which the excitation source 30 is bonded, and the bezel 52 is thus caused to flexurally vibrate. When the LCD module (LCD device) according to this preferred embodiment of the present invention is used alone or used where nothing is externally attached thereto, the flexural vibration of the bezel 52 is emitted directly into the air, and the sound vibrations thus reach the user. Even when this LCD module is used in an electronic device such that the LCD module is enclosed by some outer packaging, the bezel 51 or 52 is fixed to the frame of the electronic device. As a result, sound vibrations from the excitation source 30 are transmitted to the outside through the connecting members fastening the LCD module, and thus reach the user.

An effective audio design can also be expected because the resonance effect of the cavity inside the electronic device can also be used. More particularly, projecting sound only from the front is not always desirable in portable devices that are not used in a fixed location, as are stationary devices, and for which small size and low weight are essential. In addition, when the device is portable and is held by some portion of the body, such as in the hand, while moving, vibrations emitted from the outside case of the device can also be transmitted directly to the user's body, including by bodysonics and bone conduction, and the energy consumed for sound output can therefore be used even more efficiently.

Sound vibrations passing from the excitation source 30 through the rear bezel 52 can also be transmitted through the front bezel 51 and the like to the substrates 11, 12 of the LC panel. Five different types of LCD modules arranged to address this are described below as second to sixth variations of the present preferred embodiment.

Figure 23:
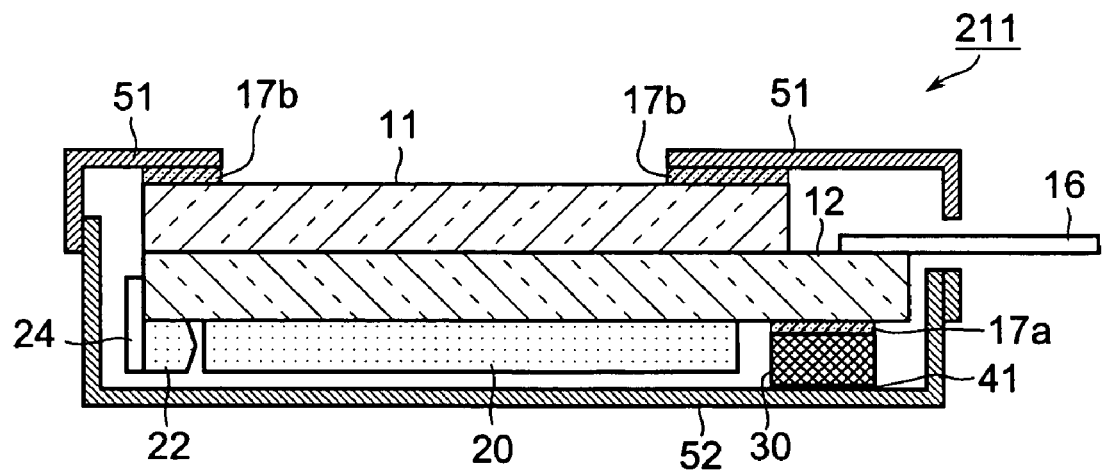
FIG. 23 is a longitudinal section view showing a second, alternative, arrangement of the LCD device according to the ninth preferred embodiment of the present invention.

More specifically, in the second variation of this preferred embodiment (LCD device 211) shown in FIG. 23, a buffer material 17b is disposed between the front bezel 51 and the first substrate 11 of the LC panel, thereby blocking propagation of sound vibrations from the front bezel 51 to the LC panel.

Figure 24:
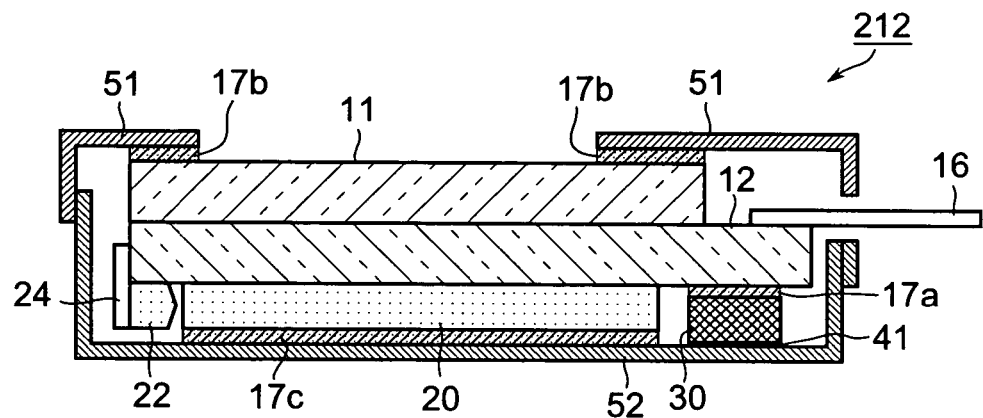
FIG. 24 is a longitudinal section view showing a third, further alternative, arrangement of the LCD device according to the ninth preferred embodiment of the present invention.

In the third variation (LCD device 212) of this preferred embodiment shown in FIG. 24, a buffer material 17c is disposed between the rear bezel 52 and light guide plate 20 to block vibrations from traveling from the rear bezel 52 through the light guide plate 20 to the LC panel, and propagation of sound vibrations from the rear bezel 52 to the LC panel is thereby prevented.

Figure 25:
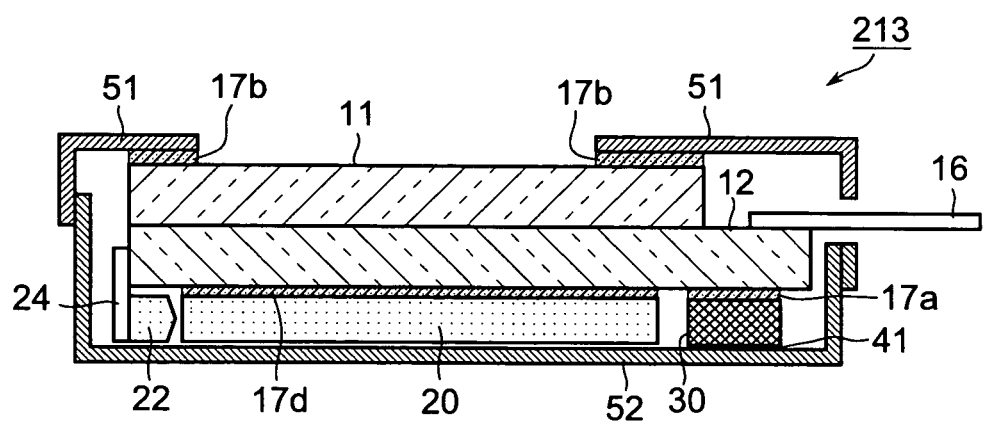
FIG. 25 is a longitudinal section view showing a fourth, further alternative, arrangement of the LCD device according to the ninth preferred embodiment of the present invention.

In the fourth variation (LCD device 213) of this preferred embodiment shown in FIG. 25, a buffer material 17d is disposed between the light guide plate 20 and the second substrate 12 of the LC panel, thereby blocking the propagation of sound vibrations through the path from the rear bezel 52 to the LC panel by way of the intervening light guide plate 20.

Figure 26:
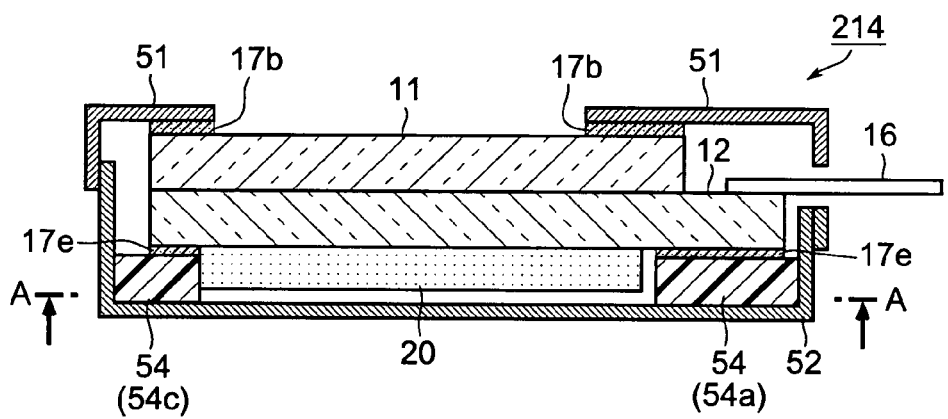
FIG. 26 is a longitudinal section view showing a fifth, further alternative, arrangement of the LCD device according to the ninth preferred embodiment of the present invention.

In the fifth variation (LCD device 214) of this preferred embodiment shown in FIG. 26, which corresponds to a section view through line B-B in FIG. 6, a buffer material 17e is disposed between the chassis 54 and the second substrate 12 of the LC panel, thereby blocking the propagation of sound vibrations through the path from the rear bezel 52 to the LC panel by way of the intervening chassis 54.

Figure 27:
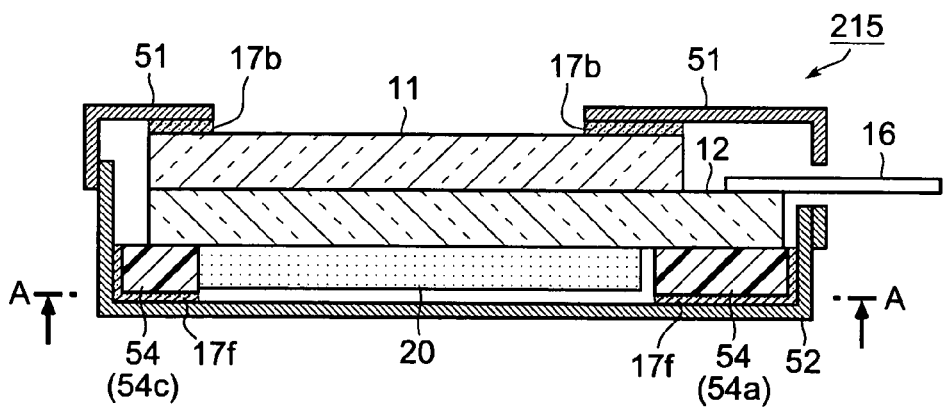
FIG. 27 is a longitudinal section view showing a sixth, further alternative, arrangement of the LCD device according to the ninth preferred embodiment of the present invention.

In the sixth variation (LCD device 215) of this preferred embodiment shown in FIG. 27, which corresponds to a section view through line B-B in FIG. 6, a buffer material 17f is disposed between the chassis 54 and the rear bezel 52 portion of the frame. As a result, the chassis 54 can be disposed in contact with the LC panel while both can be freely supported, and the propagation of sound vibrations through the path from the rear bezel 52 to the LC panel by way of the intervening chassis 54 can be blocked while the chassis 54 continues to hold the LC panel fixed.

Note that the same materials and configuration used for the above-described buffer material 17a can be used for the buffer materials 17b to 17f in the foregoing second to sixth variations. Note, further, that the arrangement of the present preferred embodiment can use any combination of the foregoing second to sixth arrangements shown in FIG. 23 to FIG. 27.

In the LCD modules according to this preferred embodiment of the present invention, the location of the excitation source 30 is moved (offset) only slightly towards the rear bezel 52 from the second substrate 12 of the LC panel in comparison with the arrangement of the first preferred embodiment (shown in FIG. 1), and the relative positions of the light source and sound source can thus remain the same as in the first preferred embodiment. The present preferred embodiment of the invention thus yields the same effects as the first preferred embodiment described above, including preventing any increase in the external size.

As described above, the bezel 52 of the LCD module is preferably used as the diaphragm for sound output in this preferred embodiment of the present invention, the excitation source 30 is disposed in the area where space is available on the back side of the connector portion of the FPC 16, and the light source 22 is disposed at a position opposite the excitation source 30 with the light guide plate 20 therebetween. The LC panel is also separated from the transmission of sound vibrations by a space or buffer material 17a to 17d. A sound output function can therefore be achieved in an LCD module according to this preferred embodiment of the present inven-

Tenth Preferred Embodiment

Figure 28:
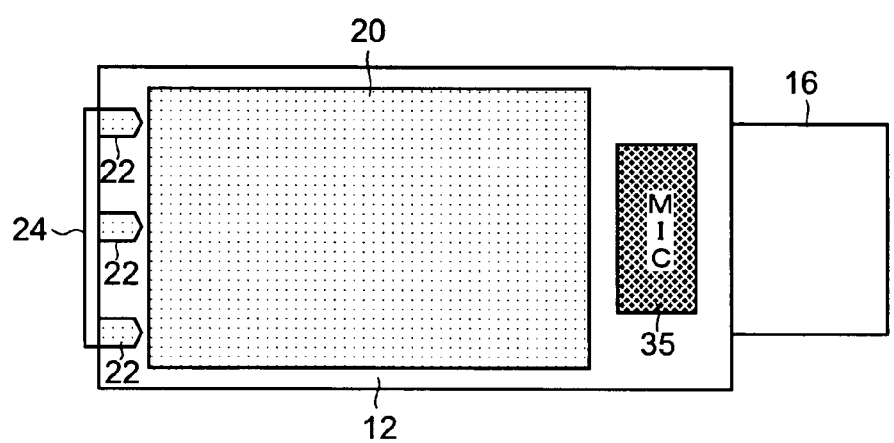
FIG. 28 is a bottom view showing the liquid crystal panel and associated parts in an LCD device according to a tenth preferred embodiment of the present invention.

FIG. 28 is a bottom view showing the liquid crystal panel and associated parts in an LCD device according to a tenth preferred embodiment of the present invention, that is, a bottom view of the back of the LCD module in this preferred embodiment. This LCD device has a pickup 35 for converting mechanical vibrations to an electric signal in place of the excitation source 30 for achieving a sound output function. Other aspects of the arrangement of this preferred embodiment are preferably substantially the same as in the first preferred embodiment, like parts are identified by like reference numerals, and further description thereof is thus omitted here. However, the FPC 24 whereby the LED 22 is electrically connected is disposed at and near the side of the second substrate 12 instead of as shown in FIG. 1. This pickup 35 could be manufactured using a piezoelectric element made from quartz, Rochelle salt crystals, or a ceramic thin plate, for example.

When sound waves passing through the air around the LCD device are picked up and cause the second substrate 12 to vibrate in this preferred embodiment of the present invention, the pickup 35 disposed at the outside surface of the second substrate 12 converts those vibrations to an electric signal, which is output as a sound signal externally to the LCD device (another device inside the electronic device using the LCD device). A sound input function (microphone function) is thus achieved in this LCD device.

In this preferred embodiment of the present invention the pickup 35 is disposed at the area on the back of the second substrate 12 opposite the connector portion of the FPC 16, that is, where space is available, and the LED 22 light source is disposed at a position opposite the pickup 35 with the light guide plate 20 therebetween. As a result, a sound input function can thus be added to a transparent or semi-transparent LCD device while minimizing any increase in the external size.

Eleventh Preferred Embodiment

Figure 29:
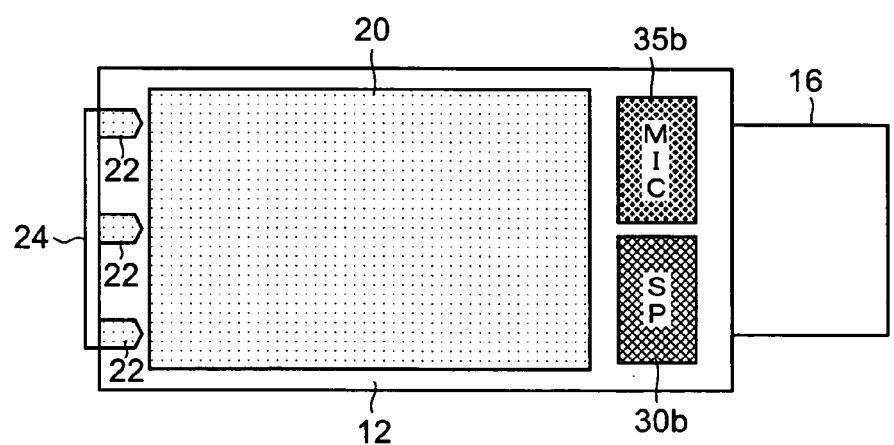
FIG. 29 is a bottom view showing the liquid crystal panel and associated parts in an LCD device according to an eleventh preferred embodiment of the present invention.

FIG. 29 is a bottom view showing the liquid crystal panel and associated parts in an LCD device according to an eleventh preferred embodiment of the present invention, that is, a bottom view of the back of the LCD module in this preferred embodiment of the present invention. This LCD device has both an excitation source 30b for achieving a sound output function (speaker function) and a pickup 35b for converting mechanical vibrations to electric signals.

In the arrangement shown in FIG. 29, the excitation source 30b and pickup 35b are both disposed at the position where the excitation source 30 is located in the first preferred embodiment, that is, at a position on the back of the second substrate 12 of the LC panel opposite the connector portion of the FPC 16. Other aspects of the arrangement of this preferred embodiment are preferably substantially the same as in the first preferred embodiment, like parts are identified by like reference numerals, and further description thereof is thus omitted here. However, the FPC 24 whereby the LED 22 is electrically connected is disposed at and near the side of the second substrate 12 instead of as shown in FIG. 1. Note that the relative positions of the excitation source and pickup shall not be limited to the arrangement shown in FIG. 29. Furthermore, the excitation source 30b and pickup 35b are longitudinally aligned in FIG. 29, but a long, narrow excitation source and pickup could be arranged side by side, for example. A plurality of excitation sources or a plurality of pickups could also be provided.

With this preferred embodiment of the present invention, the excitation source 30b and pickup 35b are disposed at the area on the back of the second substrate 12 opposite the connector portion of the FPC 16, that is, where space is available, and the LED 22 light source is disposed at a position opposite the excitation source 30b and the pickup 35b with the light guide plate 20 therebetween. As a result, a sound output function and a sound input function can thus be added to a transparent or semi-transparent LCD device while minimizing any increase in the external size.

It should be noted that the second substrate 12 of the LC panel is used by both the excitation source 30b and pickup 35b in the present preferred embodiment. As a result, if the sound output function and sound input function are used at the same time, the vibrations of the second substrate 12 for projecting sound waves from the second substrate 12 into the surrounding air will also be converted to electric signals by the pickup 35b. The electric signals generated by the pickup 35b will thus contain signals for both the sound to be input and the sound to be output. However, this problem can be avoided by an arrangement that, for example, generates an opposite phase signal of the sound signal to be supplied to the excitation source 30b, adds this opposite phase signal to the electric signal output from the pickup 35b, and thereby cancels the signal component representing the audio output in the converted electric signal.

Twelfth Preferred Embodiment

In the foregoing fifth and sixth preferred embodiments that are arranged to control the position from which sound is produced from the LC panel, a signal processing circuit 403 is used to adjust the phase and amplitude of the sound signals S1 to S3 to be supplied to the excitation sources 30a to 30c, and this signal processing circuit 403 is disposed externally to the LCD device (see FIG. 15, FIG. 17). The signal processing circuit 403 could, however, be disposed inside the LCD device (LCD module 205).

Furthermore, the signal processing circuit 403 adjusts the phase and amplitude of the sound signals S1 to S3 by analog signal processing, but digital signal processing could be used. Alternatively, this signal processing could be handled in software by the microcomputer 401 or a digital signal processor (DSP).

While the present invention has been described with respect to preferred embodiments thereof, it will be apparent to those skilled in the art that the disclosed invention may be modified in numerous ways and may assume many embodiments other than those specifically described above. Accordingly, it is intended that the appended claims cover all modifications of the invention that fall within the true spirit and scope of the invention.

The invention claimed is:

1. A liquid crystal display device comprising:
    a liquid crystal panel including a first substrate, a second substrate, and a liquid crystal layer disposed between the first substrate and the second substrate;
    a light guide plate disposed on the side of the second substrate that is not in contact with the liquid crystal layer;
    a connection terminal portion disposed at an edge portion of the second substrate on the side thereof in contact with the liquid crystal layer;

an excitation source disposed at an edge portion of the second substrate on the side thereof that is not in contact with the liquid crystal layer at a position opposite the connection terminal portion; and a light source disposed near at least one side of the light guide plate other than the side of the light guide plate that is closest to the excitation source so that light enters the light guide plate from the side at which the light source is disposed; wherein the excitation source produces sound by causing the second substrate to flexurally vibrate according to an externally supplied sound signal.

2. A liquid crystal display device as described in claim 1, wherein the light source is disposed opposite to the excitation source with the light guide plate disposed therebetween.

3. A liquid crystal display device as described in claim 1, wherein the light source is disposed near a side of the light guide plate that is adjacent to the side closest to the excitation source.

4. A liquid crystal display device as described in claim 1, further comprising a frame arranged to house the liquid crystal panel and light guide plate, wherein the excitation source is disposed in contact with the frame or bonded to the frame, and causes the frame to flexurally vibrate according to the sound signal.

5. A liquid crystal display device as described in claim 1, wherein the second substrate comprises a glass plate of which one side is in contact with the liquid crystal layer and a sheet of optical material disposed to cover a predetermined effective display area on the other side of the glass plate, and the excitation source is disposed in contact with the glass plate at an edge portion thereof in an area outside the effective display area on said other side of the glass plate, and directly causes the glass plate to flexurally vibrate according to said sound signal.

6. A liquid crystal display device as described in claim 1, wherein the excitation source is disposed at the edge portion of the second substrate on the side thereof not in contact with the liquid crystal layer at a position corresponding to a middle portion of the connection terminal portion.

7. A liquid crystal display device as described in claim 6, further comprising a frame arranged to house the liquid crystal panel and light guide plate, and a chassis fit to an inside surface on a back side of the frame arranged to support the liquid crystal panel, wherein the liquid crystal panel is housed in the frame so that the first substrate is positioned on a front side and the second substrate is positioned on the back side, and the chassis has a thick-walled portion formed in corner areas at both end portions of the edge portion on the side of the second substrate not in contact with the liquid crystal layer.

8. A liquid crystal display device as described in claim 1, further comprising at least one other excitation source in addition to said excitation source, wherein said other excitation source causes the first or second substrate to flexurally vibrate according to an externally supplied sound signal.

9. An electronic device having a liquid crystal display device as described in claim 8, further comprising a signal processor arranged to change a sound output position in the first or second substrate by controlling the phase and amplitude of sound signals to be input to the plurality of excitation sources including said other excitation source.

10. An electronic device having a liquid crystal display device as described in claim 8, further comprising a data processor arranged to receive combined data containing image data representing an image to be displayed on the liquid crystal panel and position data denoting a sound output position in the image and separate and output the image data and position data, and a signal processor arranged to control the phase and amplitude of sound signals to be input to the plurality of excitation sources including said other excitation source based on the position data output from the data processor so that sound is output from a position in the first or second substrate corresponding to the sound output position in the image.

11. A liquid crystal display device as described in claim 1, further comprising a pickup unit arranged to convert vibrations of the second substrate to electric signals when external sound waves cause the second substrate to vibrate, and wherein said pickup unit is disposed near said excitation source and together with said excitation source.

12. An electronic device comprising a liquid crystal display device as described in claim 1.

13. A liquid crystal display device as described in claim 1, further comprising a frame arranged to house the liquid crystal panel and light guide plate, and a structural panel disposed between the frame and the liquid crystal panel or the light guide plate so that one side of the structural panel is in contact with the inside surface of the frame, wherein the excitation source is disposed in contact with, or bonded to, the other side of the structural panel and causes the frame to flexurally vibrate according to the sound signal simultaneously with the liquid crystal panel by way of the intervening structural panel.

14. A liquid crystal display device as described in claim 13, wherein the structural panel is located on a display surface side of the liquid crystal panel and comprises a sensor arranged to function as an operating unit.

15. A liquid crystal display device as described in claim 14, wherein the structural panel has a display arranged to indicate functions executed by predetermined operations, and the excitation source receives a signal denoting a vibration pattern corresponding to the predetermined operation from a predetermined signal generator disposed externally or internally to the liquid crystal display device, and causes the structural panel to flexurally vibrate in the vibration pattern corresponding to the predetermined operation based on said signal.

16. A liquid crystal display device as described in claim 13, wherein the structural panel is located on a display surface side of the liquid crystal panel and comprises a complementary display.

17. A liquid crystal display device as described in claim 16, wherein the structural panel has a display arranged to indicate functions executed by predetermined operations, and the excitation source receives a signal denoting a vibration pattern corresponding to the predetermined operation from a predetermined signal generator disposed externally or internally to the liquid crystal display device, and causes the structural panel to flexurally vibrate in the vibration pattern corresponding to the predetermined operation based on said signal.

18. An electronic device comprising a liquid crystal display device as described in claim 13.

19. A liquid crystal display device comprising:

a liquid crystal panel including a first substrate, a second substrate, and a liquid crystal layer disposed between the first substrate and the second substrate;

a light guide plate disposed on the side of the first substrate or the second substrate that is not in contact with the liquid crystal layer;

a light source disposed near a predetermined side of the light guide plate so that light enters the light guide plate from said predetermined side; and an excitation source disposed at an edge portion of the first or second substrate near a side of the light guide plate other than said predetermined side; wherein the excitation source produces sound by causing the first or second substrate to flexurally vibrate according to an externally supplied sound signal.

20. A liquid crystal display device as described in claim 19, wherein the light source is disposed opposite to the excitation source with the light guide plate disposed therebetween.

21. A liquid crystal display device as described in claim 19, wherein the light source is disposed near a side of the light guide plate that is adjacent to the side closest to the excitation source.

22. A liquid crystal display device as described in claim 19, further comprising a frame arranged to house the liquid crystal panel and light guide plate, wherein the excitation source is disposed in contact with the frame or bonded to the frame, and causes the frame to flexurally vibrate according to the sound signal.

23. A liquid crystal display device as described in claim 19, wherein the first or second substrate comprises a glass plate of which one side is in contact with the liquid crystal layer and a sheet of optical material disposed to cover a predetermined effective display area on the other side of the glass plate, and the excitation source is disposed in contact with the glass plate at an edge portion thereof in an area outside the effective display area on said other side of the glass plate, and directly causes the glass plate to flexurally vibrate according to said sound signal.

24. A liquid crystal display device as described in claim 19, further comprising at least one other excitation source in addition to said excitation source, and wherein said other excitation source causes the first or second substrate to flexurally vibrate according to an externally supplied sound signal.

25. A liquid crystal display device as described in claim 19, further comprising a pickup unit arranged to convert vibrations of the first or second substrate to electric signals when external sound waves cause the first or second substrate to vibrate, and wherein said pickup unit is disposed near said excitation source and together with said excitation source.

26. An electronic device comprising a liquid crystal display device as described in claim 19.

27. A liquid crystal display device as described in claim 19, further comprising a frame arranged to house the liquid crystal panel and light guide plate, and a structural panel disposed between the frame and the liquid crystal panel or the light guide plate so that one side of the structural panel is in contact with the inside surface of the frame, wherein the excitation source is disposed in contact with, or bonded to, the other side of the structural panel and causes the frame to flexurally vibrate according to the sound signal simultaneously with the liquid crystal panel by way of the intervening structural panel.

28. A liquid crystal display device comprising:

a liquid crystal panel including a first substrate, a second substrate, and a liquid crystal layer disposed between the first substrate and the second substrate;

a light guide plate disposed on the side of the second substrate that is not in contact with the liquid crystal layer;

a frame arranged to house the liquid crystal panel and light guide plate;

a connection terminal portion disposed at an edge portion on the side of the second substrate in contact with the liquid crystal layer;

an excitation source disposed and bonded to an inside surface of the frame at a position facing an edge portion of the second substrate on the surface thereof not in contact with the liquid crystal layer at a position on the opposite side as the connection terminal portion so that vibration is not transmitted directly to said opposite-side edge portion; and a light source held in the frame and disposed near at least one side of the light guide plate other than the side of the light guide plate closest to the excitation source so that light enters the light guide plate from the at least one side to which the light source is disposed; wherein the excitation source produces sound by causing the frame to flexurally vibrate according to an externally supplied sound signal.

29. A liquid crystal display device as described in claim 28, wherein the excitation source is disposed with a space between the excitation source and the second substrate to avoid contact with the second substrate at an expected vibration amplitude of the excitation source.

30. A liquid crystal display device as described in claim 29, further comprising a buffer material between the liquid crystal panel and the light guide plate.

31. A liquid crystal display device as described in claim 29, further comprising a buffer material between the light guide plate and the frame.

32. A liquid crystal display device as described in claim 28, further comprising a buffer material between the excitation source and the second substrate.

33. A liquid crystal display device as described in claim 32, further comprising a buffer material between the liquid crystal panel and the light guide plate.

34. A liquid crystal display device as described in claim 32, further comprising a buffer material between the light guide plate and the frame.

35. A liquid crystal display device as described in claim 28, further comprising a buffer material between the liquid crystal panel and the frame.

36. A liquid crystal display device as described in claim 35, further comprising a buffer material between the liquid crystal panel and the light guide plate.

37. A liquid crystal display device as described in claim 35, further comprising a buffer material between the light guide plate and the frame.

38. A liquid crystal display device as described in claim 28, further comprising a buffer material between the liquid crystal panel and the light guide plate.

39. A liquid crystal display device as described in claim 28, further comprising a buffer material between the light guide plate and the frame.

40. A liquid crystal display device as described in claim 28, wherein the light source is disposed opposite the excitation source with the light guide plate therebetween.

41. A liquid crystal display device as described in claim 28, wherein the light source is disposed near a side of the light guide plate that is adjacent to the side closest to the excitation source.

42. A liquid crystal display device as described in claim 28, wherein the second substrate comprises a glass plate of which one side is in contact with the liquid crystal layer and a sheet of optical material disposed to cover a predetermined effective display area on the other side of the glass plate, and the excitation source is disposed in contact with the frame at an edge portion on said other side of the glass plate in an area outside the effective display area, and causes the frame to flexurally vibrate according to said sound signal.

43. A liquid crystal display device as described in claim 28, wherein the excitation source is disposed at an edge portion of the second substrate on the side thereof not in contact with the liquid crystal layer at a position corresponding to a middle portion of the connection terminal portion.

44. A liquid crystal display device as described in claim 43, further comprising a chassis fit to an inside surface on a back side of the frame arranged to support the liquid crystal panel, wherein the liquid crystal panel is housed in the frame so that the first substrate is positioned on a front side and the second substrate is positioned on the back side, and the chassis has a thick-walled portion formed in corner areas at both end portions of the edge portion on the side of the second substrate not in contact with the liquid crystal layer.

45. A liquid crystal display device as described in claim 44, further comprising a buffer material between the liquid crystal panel and the chassis.

46. A liquid crystal display device as described in claim 44, further comprising a buffer material between the chassis and the frame.

47. A liquid crystal display device as described in claim 28, further comprising at least one other excitation source in addition to said excitation source, wherein said other excitation source causes the frame to flexurally vibrate according to an externally supplied sound signal.

48. An electronic device comprising a liquid crystal display device as described in claim 28.

* * * * *